United States Patent
Addis et al.

(10) Patent No.: US 6,318,728 B1
(45) Date of Patent: Nov. 20, 2001

(54) BRUSH-SEAL DESIGNS FOR ELASTIC FLUID TURBINES

(75) Inventors: Mark E. Addis, Wakefield, RI (US); Willaim S. Dalton, Chesterfield, MA (US)

(73) Assignee: Demag Delaval Turbomachinery Corporation, Trenton, NJ (US)

( * ) Notice: Subject to any disclaimer, the term of this patent is extended or adjusted under 35 U.S.C. 154(b) by 0 days.

(21) Appl. No.: 09/199,127

(22) Filed: Nov. 24, 1998

Related U.S. Application Data

(62) Division of application No. 08/891,526, filed on Jul. 11, 1997, now abandoned.

(51) Int. Cl.[7] .................................. F01D 11/02
(52) U.S. Cl. ................ 277/355; 277/416; 415/174.5
(58) Field of Search ................ 277/347, 355, 277/418, 419, 416, 421; 415/173.3, 173.5, 174.2, 174.5

(56) References Cited

U.S. PATENT DOCUMENTS

| | | | |
|---|---|---|---|
| 2,600,991 | * 6/1952 | Hargrove | 277/416 |
| 4,436,311 | * 3/1984 | Brandon | 277/53 |
| 5,176,389 | * 1/1993 | Noone et al. | 277/53 |
| 5,316,318 | * 5/1994 | Veau | 277/53 |
| 5,362,072 | * 11/1994 | Dalton | 277/53 |
| 5,395,124 | * 3/1995 | Brandon | 277/53 |
| 5,464,226 | * 11/1995 | Dalton | 277/419 |
| 5,487,549 | * 1/1996 | Dalton et al. | 277/419 |
| 5,509,780 | * 4/1996 | Synfelt | 277/416 |
| 5,547,340 | * 8/1996 | Dalton et al. | 415/174.5 |
| 5,603,510 | * 2/1997 | Sanders | 277/419 |
| 5,749,584 | * 5/1998 | Skinner et al. | 277/53 |
| 5,775,873 | * 7/1998 | Dalton et al. | 277/53 |
| 5,810,365 | * 9/1998 | Brandon et al. | 277/419 |
| 5,971,400 | * 10/1999 | Turnquist et al. | 277/416 |
| 6,010,132 | * 1/2000 | Bagepalli et al. | 277/53 |
| 6,027,121 | * 2/2000 | Cromer et al. | 277/347 |
| 6,030,175 | * 2/2000 | Bagepalli et al. | 415/173.3 |

FOREIGN PATENT DOCUMENTS

| | | | |
|---|---|---|---|
| 2344666 | * 3/1974 | (DE) | 277/355 |
| 2301635 | * 12/1996 | (GB) | 277/53 |

* cited by examiner

*Primary Examiner*—Teri Pham Luu
(74) *Attorney, Agent, or Firm*—Hopgood, Calimafde, Judlowe & Mondolino, LLP

(57) ABSTRACT

Disclosed are improved spillstrip and packing rings, and packing ring segments employing novel brush elements for use in forming seals in axial flow elastic fluid machines, and compressor and turbine machines containing the same.

32 Claims, 23 Drawing Sheets

SETUP FOR MACHINING SPILL STRIP BODIES

BRUSH TRIMMING OPERATION

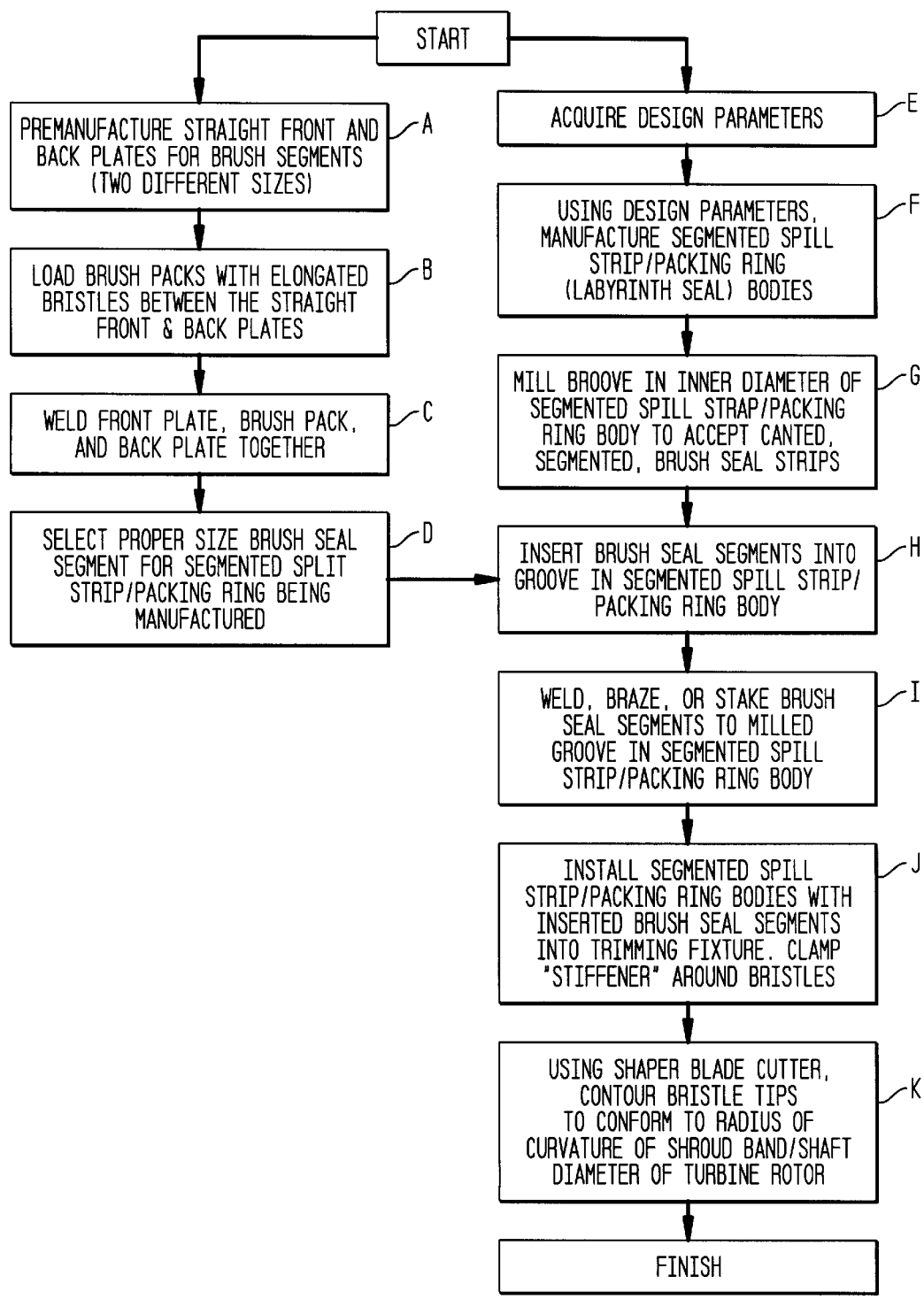

SEGMENTED BRUSH SEAL DROP STUDY

BASED ON CURVED SEGMENTS  >>>  RADIUS OF CURVATURE OF SEGMENT  11.500

SEGMENT LENGTH (IN INCHES)

PACKING RING SLOT DIAMETER (IN INCHES)

| | 3/8 | 1/2 | 3/4 | 1 | 1 1/4 | 1 1/2 | 2 | 2 1/2 | 3 | 3 1/2 | 4 |
|---|---|---|---|---|---|---|---|---|---|---|---|
| 20 | 0.0002 | 0.0004 | 0.0009 | 0.0016 | 0.0026 | 0.0037 | 0.0066 | 0.0103 | 0.0149 | 0.0204 | 0.0268 |
| 21 | 0.0001 | 0.0003 | 0.0006 | 0.0010 | 0.0016 | 0.0023 | 0.0042 | 0.0065 | 0.0094 | 0.0129 | 0.0170 |
| 22 | 0.0001 | 0.0001 | 0.0003 | 0.0005 | 0.0008 | 0.0011 | 0.0020 | 0.0031 | 0.0045 | 0.0062 | 0.0081 |
| 23 | 0.0000 | 0.0000 | 0.0000 | 0.0000 | 0.0000 | 0.0000 | 0.0000 | 0.0000 | 0.0000 | 0.0000 | 0.0000 |
| 24 | 0.0001 | 0.0001 | 0.0003 | 0.0005 | 0.0007 | 0.0010 | 0.0018 | 0.0029 | 0.0041 | 0.0056 | 0.0074 |
| 25 | 0.0001 | 0.0002 | 0.0005 | 0.0009 | 0.0014 | 0.0020 | 0.0035 | 0.0055 | 0.0079 | 0.0108 | 0.0142 |
| 26 | 0.0002 | 0.0003 | 0.0007 | 0.0013 | 0.0020 | 0.0028 | 0.0050 | 0.0079 | 0.0114 | 0.0156 | 0.0205 |
| 27 | 0.0002 | 0.0004 | 0.0009 | 0.0016 | 0.0025 | 0.0036 | 0.0065 | 0.0101 | 0.0147 | 0.0200 | 0.0263 |
| 28 | 0.0003 | 0.0005 | 0.0011 | 0.0019 | 0.0030 | 0.0044 | 0.0078 | 0.0122 | 0.0177 | 0.0241 | 0.0317 |
| 29 | 0.0003 | 0.0006 | 0.0013 | 0.0023 | 0.0035 | 0.0051 | 0.0090 | 0.0142 | 0.0205 | 0.0279 | 0.0367 |
| 30 | 0.0004 | 0.0006 | 0.0014 | 0.0025 | 0.0040 | 0.0057 | 0.0102 | 0.0160 | 0.0231 | 0.0315 | 0.0413 |
| 31 | 0.0004 | 0.0007 | 0.0016 | 0.0028 | 0.0044 | 0.0063 | 0.0113 | 0.0177 | 0.0255 | 0.0348 | 0.0457 |
| 32 | 0.0004 | 0.0008 | 0.0017 | 0.0031 | 0.0048 | 0.0069 | 0.0123 | 0.0192 | 0.0278 | 0.0379 | 0.0498 |
| 33 | 0.0005 | 0.0008 | 0.0019 | 0.0033 | 0.0052 | 0.0074 | 0.0132 | 0.0207 | 0.0299 | 0.0409 | 0.0536 |
| 34 | 0.0005 | 0.0009 | 0.0020 | 0.0035 | 0.0055 | 0.0079 | 0.0141 | 0.0221 | 0.0319 | 0.0436 | 0.0572 |
| 35 | 0.0005 | 0.0009 | 0.0021 | 0.0037 | 0.0058 | 0.0084 | 0.0150 | 0.0234 | 0.0338 | 0.0462 | 0.0606 |

DROP (Δ RADIUS) OF CURVATURE (IN INCHES)

SEGMENT RADIUS < PACKING RING SLOT RADIUS

SEGMENT RADIUS > PACKING RING SLOT RADIUS

ROTOR DIAMETER = 12 IN

BRUSH SEGMENTS PER TIP SEAL SEGMENT = 5

BRUSH SEGMENTS USED IN 90° = 13

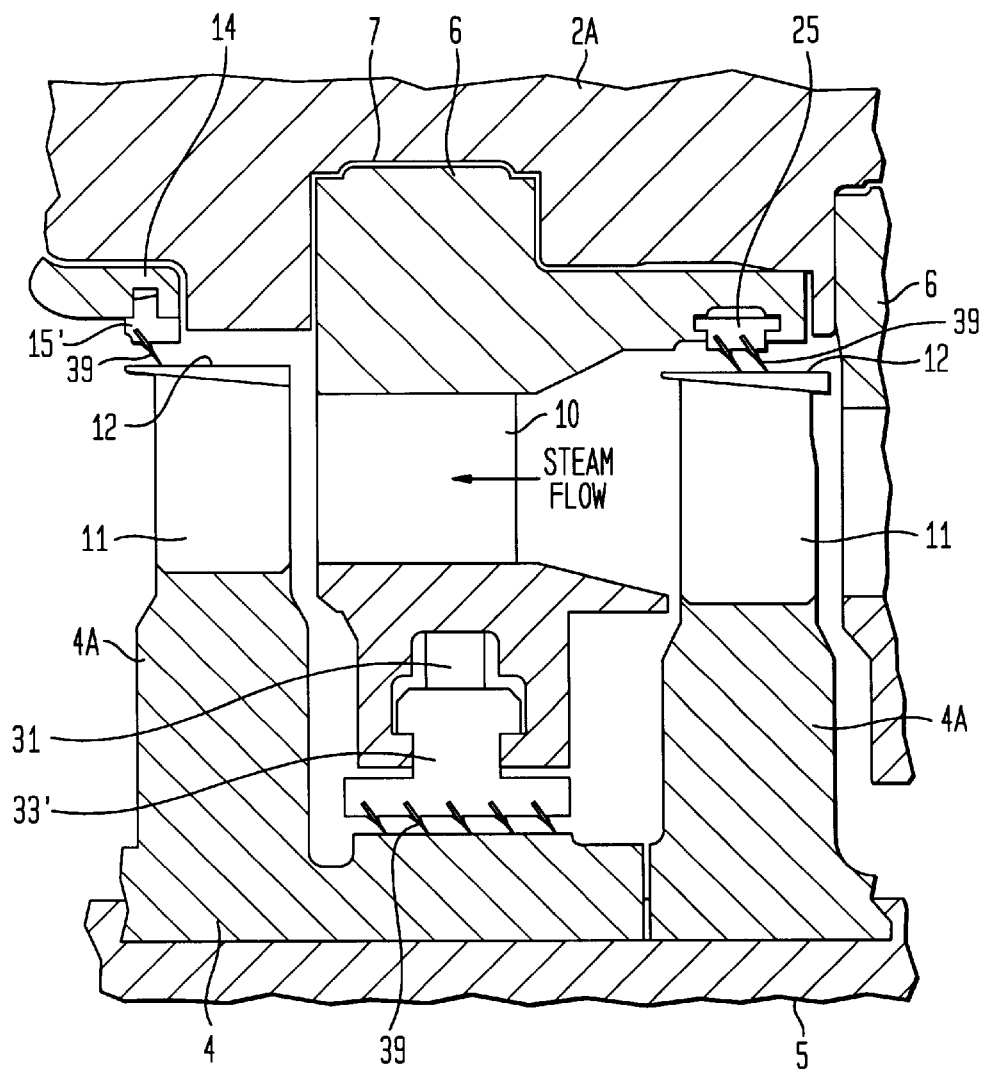

MANUFACTURING FLOWCHART

MANUFACTURING FLOWCHART

BRUSH-SEAL DESIGNS FOR ELASTIC FLUID TURBINES

This application is a division of application Ser. No. 08/891,526, filed Jul. 11, 1997, now abandoned.

BACKGROUND OF INVENTION

1. Field of Invention

The present invention relates generally to improved brush seal designs for use in axially flow elastic fluid turbines.

2. Brief Description of the Prior Art

The use of axial flow elastic fluid turbines, such as axial flow steam turbines, plays a very important role in the production of electric power in our society. In order produce electrical power from an electrical power generator installed at a power plant, it is necessary to rotate the rotor shaft thereof in a magnetic field produced by the stator field windings of the power generator. Typically, the torque required to rotate the rotor shaft at a sufficient angular velocity is provided by a steam turbine whose output shaft is mechanically coupled to the rotor shaft of the generator. Often, in a typical power plant, there will be a number cf steam turbines each driving one or more electrical power generators.

In general, each steam turbine comprises a shaft rotatably supported by bearings which are encased in a housing or casting typically referred to as the turbine shell. In order to rotate the rotor shaft using the momentum of super-heated vapor (i.e., "steam"), a series of turbine stages are sequentially arranged along the axis of the shaft. A boiler, typically located external to the. turbine casting, is provided for the purpose of generating steam. External to the turbine casting are steam pipes which are used to conduct the steam from the boiler to particular sections of the turbine, that are typically classified by operating pressure. Along each section of the turbine, there are typically a number of turbine stages.

At each turbine stage, a turbine rotor is fixedly mounted to the rotor shaft. Each turbine rotor has a plurality of blades which radially extend a predetermined distance from the shaft, towards a circumferentially extending shroud band (i.e., cover) that is secured to the tenon portions of the blades. In general, each turbine blade is oriented at an acute angle with respect to the axis of rotation of its rotor. In order that each turbine rotor is permitted to freely rotate with the turbine shaft, the turbine casting has circumferential recesses to accommodate the rotor structures along the shaft. A stationary diaphragm is installed behind each rotor in a circumferential joint formed in the turbine casting. Each turbine has a ring of steam nozzles circumferentially extending about the inner structure of the diaphragm. These nozzles are located at the same radial position as the blades in its associated rotor. The function of each nozzle is to receive steam from the passageways in the turbine casting and to physically direct the steam against the rotating blades of its associated rotor. To establish a "tip seal" with the shroud band of each turbine rotor, a ring of spillstrips segments are supported from the diaphragm at each stage.

As the steam travels through the turbine, a portion of its linear momentum is transformed into the angular momentum of the rotor blades at each turbine stage, thereby imparting torque to the turbine shaft (i.e., rotor shaft). At each subsequent stage, the pressure of the steam path is typically reduced. Thus at these downstream stages it is often necessary to increase the length of the rotor blades and the size of the associated diaphragms in order to extract kinetic energy from axially flowing steam of reduced pressure.

A major problem in turbine design relates to the quality of steam seals between the various stationary and rotating components along the steam flow path in the turbine. In general, there are several locations within the turbine where such seals must be established to ensure high turbine efficiency.

The first location where steam seals are required is between the outer portion of each rotor and its associated diaphragm have been effected using a segmented spillstrip ring of the type disclosed in U.S. Pat. No. 5,547,340, incorporated herein by reference. While this Patent discloses an spillstrip design that offers improvements over prior art designs, it is not without its shortcomings and drawbacks. In particular, during start-up operations when the rotor exhibits low frequency modes of operation about its axis, the tips of the rigid fin-like structure (e.g., fin seals) projecting along the spillstrip segments tend to rub against and/or cut into the shroud-band of the associated rotor, causing damage thereto during the start-up process. The only safeguards offered against such rubbing action has been to design the spillstrips so that there exists sufficient clearance between the tip portions of the fins on the spillstrips and the shroud band of the rotor. This approach, however, results in a degrading of the tip seal, allowing steam to pass through the clearance area, and not through and over the blades of the rotor, thereby reducing the performance of the turbine.

The second location where steam seals are required is between the rotor and the turbine shaft. Creating seals over such regions has been addressed along time ago by installing a segmented packing ring structure between the rotor and the turbine shaft at each turbine stage. Each packing ring structure consists of a first ring structure with multiple rows of fins (i.e., seal teeth) and a second ring structure with multiple rows of surface projections. The first ring structure is mounted from the associated diaphragm, whereas the second ring structure is mounted to the turbine shaft. Together, the rows of fins and projection structures create a labyrinth-type seal which presents a high impedence flow path to pressurized steam. However, during start up operation, low frequency modes of operation about the turbine axis tends to cause the tip portions of each row of fins to move radially outwards and inwards. To avoid tip rubbing and damage to such packing ring structures, it is necessary to design the fins and surface projections with sufficient clearance to avoid tip rubbing during start-up operation. This, however, necessarily degrades the quality of the labyrinth seal.

In U.S. Pat. Nos. 4,436,311 and 5,395,124 to Brandon, the problem of fin tip rubbing in packing ring design has been addressed by providing a retractable segmented packing ring structure between each rotor and turbine shaft. The manner in which the quality of the labyrinth seal is improved with this design is described as follows. During startup operation, when low frequency rotor vibration is predominant, the diaphragm-mounted packing ring segments are spring-biased in a radial direction away from the turbine shaft, reducing the risk of fin-tip portion rubbing and packing ring damage. As the rotor increases its angular speed, low frequency vibration is naturally reduced, and the packing ring segments are forced to move closer to the turbine shaft by steam pressure, improving the quality of the labyrinth seal among the rows of fins and surface projections in the packing ring structure, thereby improving the efficiency of the turbine.

An alternative solution to the problem of fin tip rubbing in packing ring designs is disclosed in UK Patent Application Publication No. GB 2 301 635 A. In this UK Patent Publication, a brush-type element is installed between a pair of firs extending from the packing ring segments mounted on the diaphragm. The function of the brush seal is to improve the quality of the labyrinth seal during all phases of operation. A major shortcoming with this design, however, is that during startup operations it does not provide a way of protecting the tips portions of the fin seals without designing a high degree of clearance into the design. Consequently, by virtue of such increased clearance requirements, the quality of the labyrinth seal provided by this prior art packing seal design is necessarily compromised. In addition, the brush seal design disclosed in this prior art publication is very expensive to manufacture, decreasing the price-to-performance ratio of this packing ring structure.

Thus, there is great need in the art for an improved brush seal design for providing high quality tip seals and labyrinth seals in axial flow elastic fluid turbines, while avoiding the shortcomings and drawbacks of prior art technologies.

OBJECTS AND SUMMARY OF THE INVENTION

Accordingly, it is a primary object of the present invention to provide an improved brush-seal design for use in creating high quality tip seals and labyrinth seals in axial flow elastic turbines, while avoiding the shortcomings and drawbacks of prior art brush-seal designs.

A further object of the present invention is to provide such a brush-seal design, which effectively reduces turbine part wear while providing an improved seal between each stage of the turbine by accommodating for transient radial deflections of the turbine rotor and shaft during startup operation.

A further object of the present invention is to provide such an improved segmented spillstrip ring comprising a plurality of spillstrip segments, each containing a plurality of brush segments, wherein the angle of the end edges thereof is selected so that a different number of the same size brush segments of the present invention can be configured together to form brush-type tip seals for turbine rotors of different diameters.

A further object of the present invention is to provide such an improved segmented spillstrip ring, wherein the end surfaces of the brush segments, like the bristles thereof, extend in the direction of rotation of the turbine rotor during operation, and as the pressure across the spillstrip ring increases, the bristles of the brush segments are forced.

A further object of the present invention is to provide such an improved segmented spillstrip ring, wherein each brush segment is constructed by binding bristles between a pair of metal plates to form a brush seal strip that is installed within a groove in a tip seal segment.

A further object of the present invention is to provide such an improved segmented spillstrip ring, wherein each brush segment is constructed by directly binding bristles within a groove formed in a tip seal segment, from which a pair of spaced-apart bristle stiffening projections extend.

A further object of the present invention is to provide such an improved segmented spillstrip ring, wherein the bristles of the brush segments extend generally within or parallel to the principal plane of the turbine rotor.

A further object of the present invention is to provide such an improved segmented spillstrip ring, wherein the bristles in the brush segments extend generally at an acute angle with respect to the principal plane of the turbine rotor, so that as the pressure across the spillstrip ring increases, the flexible bristles of the brush pack are forced in toward the rotor, thereby effectively reducing or eliminating the radial clearance between the bristle and the shroud band of the rotor allowing for rotor misalignment and rotor excursion without cutting or grooving the rotor and reducing fluid flow across the tip seal.

Another object of the present invention is to provide such an improved segmented spillstrip ring design which can compensate for undersize and oversize rotors as well as rotor which are not concentric to the spillstrip holder.

A further object of the present invention is to provide an improved segmented packing ring for use in an elastic turbine, wherein an improved seal is provided between the packing ring holder and rotor thereof.

A further object of the present invention is to provide an improved retractable segmented packing ring for use in an elastic turbine, wherein an improved labyrinth seal is formed between the retractable segmented packing ring and the turbine rotor by way of multiple rows of fins and at least a single row of bristle elements disposed therebetween.

A further object of the present invention is to provide such an improved retractable segmented packing ring, wherein the bristles in the brush segments extend at an angle in the direction of rotation of the rotor principal plane of the rotor.

A further object of the present invention is to provide such an improved retractable segmented packing ring, wherein the bristles in the brush segments extend generally at an acute angle with respect to the principal plane of the turbine rotor.

A further object of the present invention is to provide such an improved retractable segmented packing ring, wherein the bristles in the brush segments extend within a plane substantially parallel to the principal plane of the turbine rotor.

A further object of the present invention is to provide such an improved retractable segmented packing ring, wherein the bristles in the brush segments extend generally at an acute angle with respect to the principal plane of the turbine rotor.

An even further object of the present invention is to provide an axially flow steam turbine which incorporates novel spillstrip rings and retractable packing rings constructed in accordance with the principles of the present invention.

These and other objects of the present invention will become apparent hereinafter.

BRIEF DESCRIPTION OF THE DRAWINGS

For a more complete understanding of the Objects of the Present Invention, the following Detailed Description of the Illustrative Embodiment should be read in conjunction with the accompanying drawings, in which:

FIG. 10 is a flow chart setting forth the steps involved in manufacturing brush segments according to the first illustrated embodiment of the present invention shown in FIGS. 5 through 5B, as well as spillstrip ring segments and retractable packing ring segments shown in FIGS. 3, 4A, 6 and 8A, wherein the bristles of the brush segments thereof are disposed in a plane substantially parallel to the principal plane of the associated rotor, and extend at an angle in the direction of rotation of the rotor;

FIG. 15 is a cross-sectional view of a turbine stage of the present invention, showing the third and fourth illustrative embodiments of the spillstrip ring of the present invention and the fourth illustrative embodiment of the retractable packing ring of the present invention supported from. the diaphragm to form a continuous tip seal(s) and labyrinth seal, respectively, within the turbine;

DETAILED DESCRIPTION OF THE ILLUSTRATIVE EMBODIMENTS OF THE PRESENT INVENTION

Figure 1:
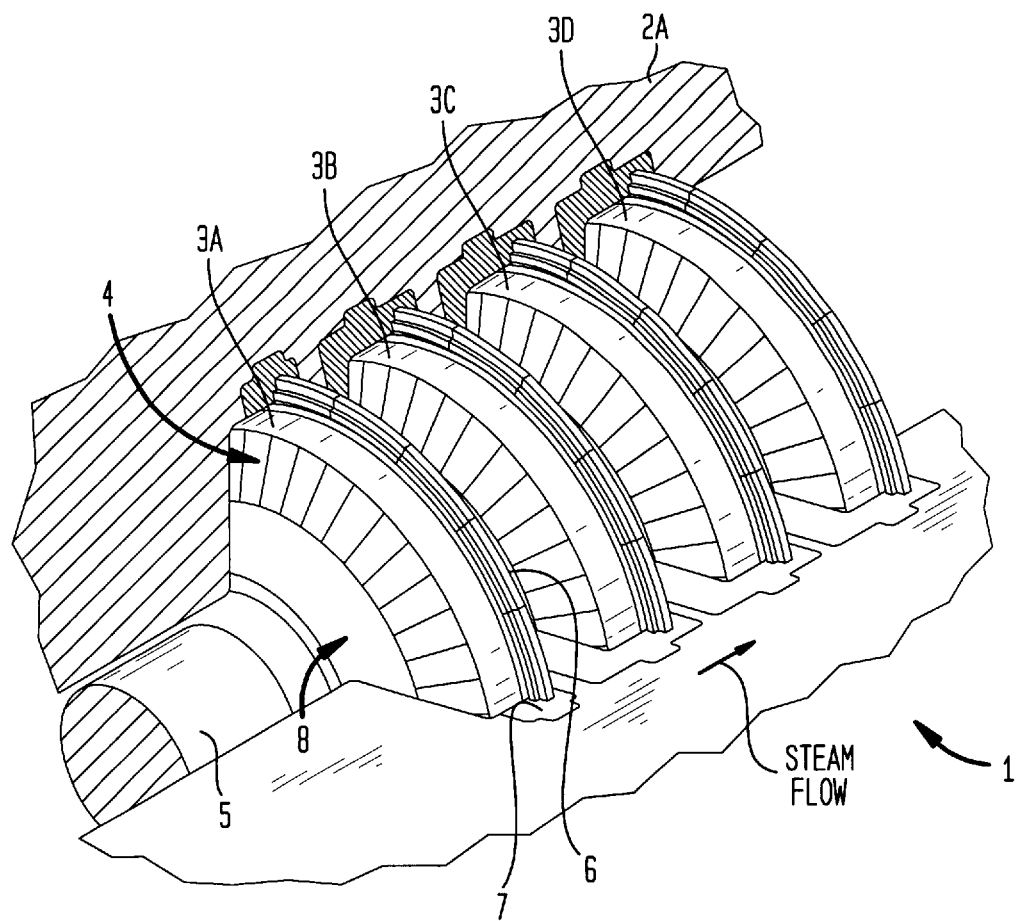
FIG. 1 is a perspective, partially fragmented view of a multistage axial flow steam turbine of the present invention, showing the diaphragm and rotor components of each stage housed within the turbine outer casting.

In general, the axial flow steam turbine 1 of the present invention generally comprises a number of turbine sections which are conventionally classified by operating pressure. Along each turbine section, a number of stages are encased within outer turbine casting 2 as shown in FIG. 1. In the illustrative embodiment, these turbine stages are identified by 3A, 3B, 3C, and 3D in FIG. 1. In general, however, the number of stages will vary from embodiment to embodiment of the present invention. Hereinafter, like reference numerals are used to indicate like structures.

Figure 2:
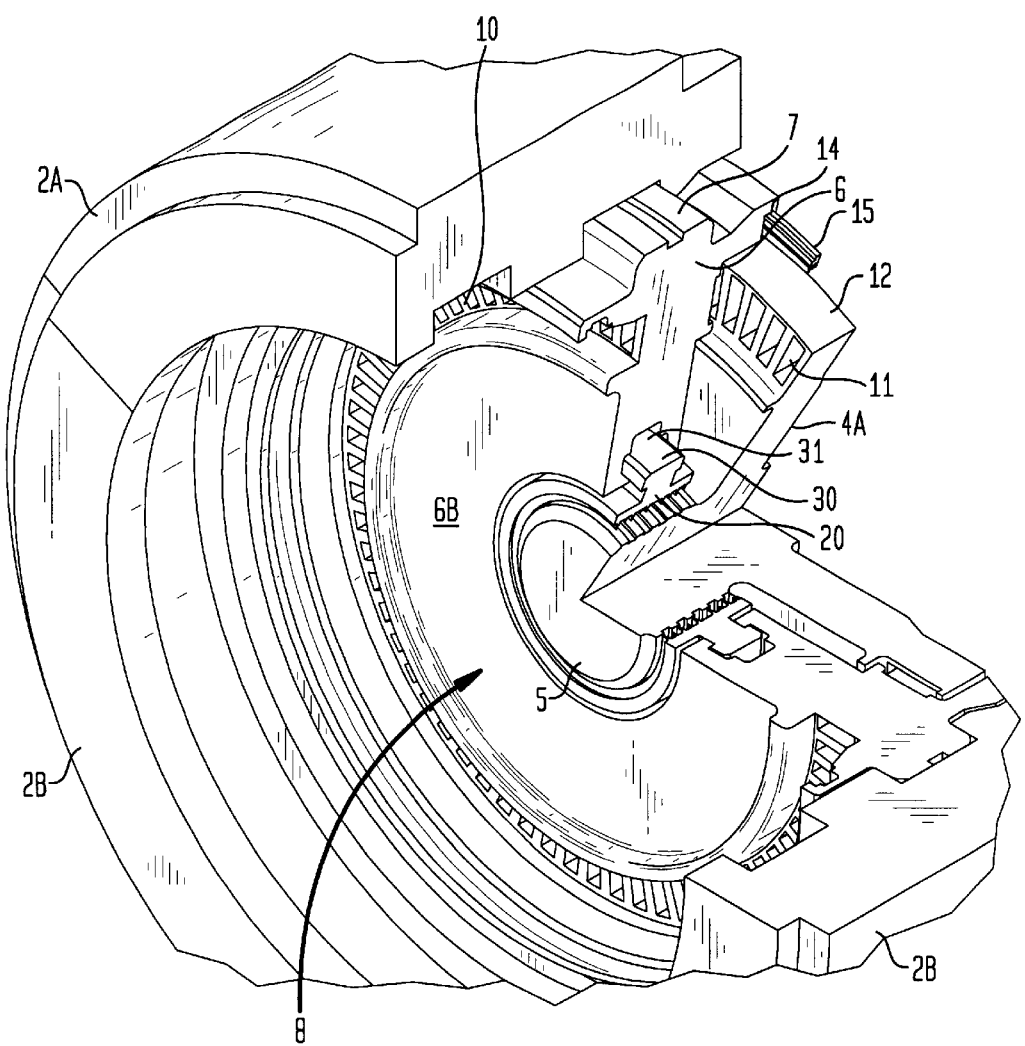
FIG. 2 is a perspective, partially fragmented view of a turbine stage of the present invention, showing (1) a portion of the first illustrative embodiment of the spillstrip ring of the present invention supported by the turbine diaphragm to form a continuous tip seal with the shroud band of its associated rotor, and also (2) a portion of the first illustrative embodiment of the retractable packing ring of the present invention supported by the turbine diaphragm forms a continuous labyrinth seal with the rotor shaft.
Figure 3:
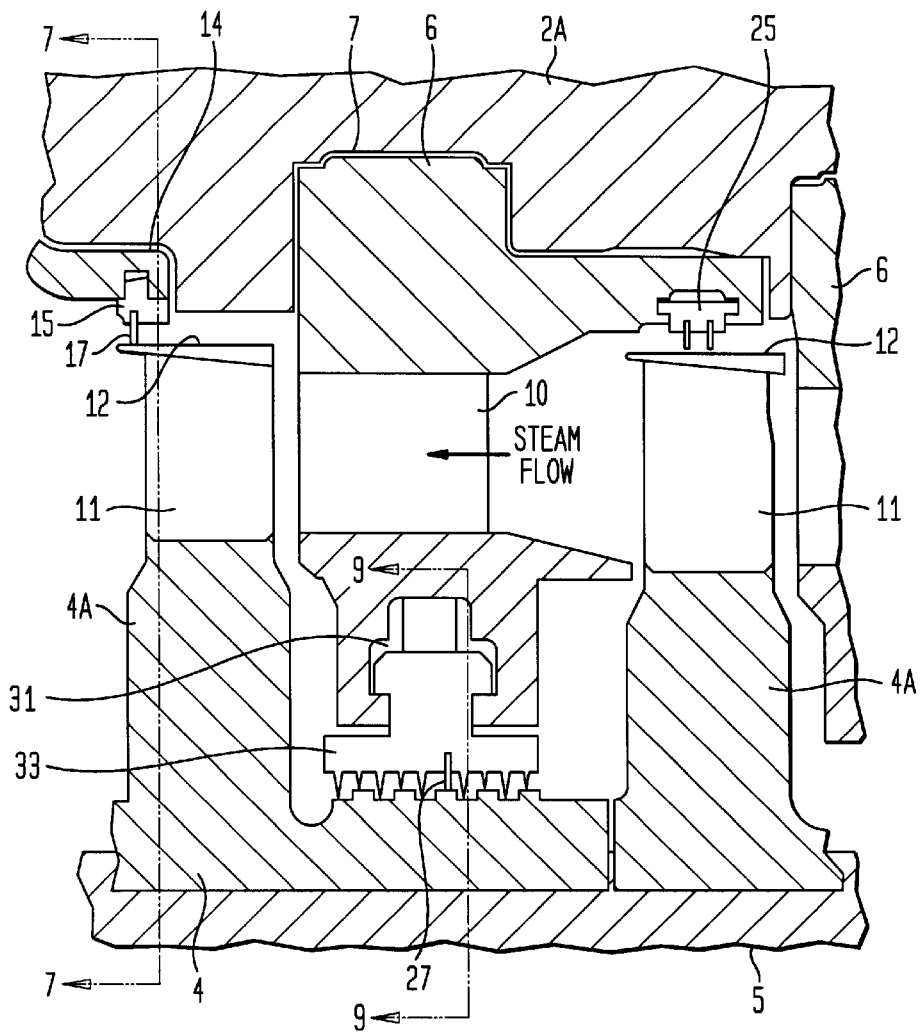
FIG. 3 is a cross-sectional view of a turbine stage of the present invention, showing the first and second illustrative embodiments of the spillstrip ring of the present invention and the first illustrative embodiment of the retractable packing ring of the present invention supported from the diaphragm to form a continuous tip seal and labyrinth seal, respectively, within the turbine.

Referring to FIGS. 1 through 3, the major components of the turbine system hereof will be described.

As shown in FIG. 1, each stage of the turbine has a turbine rotor 4 fixedly mounted to the rotor (i.e., turbine) shaft 5, and an associated turbine diaphragm 6 stationary mounted in a joint 7 in the outer turbine casing 2. The position of each turbine rotor is located slightly downstream from its associated diaphragm 6. As shown in FIGS. 1 and 3, the downstream flow direction is indicated by a right-hand directed arrow.

As shown in FIG. 1, turbine housing 2 is constructed using upper and lower casing portions 2A and 2B which are bolted together in a conventional manner to form a "turbine shell". As shown, the turbine casing has a circumferential chamber 8 for accommodating the geometry of each rotor structure along the shaft, and the geometry of each turbine diaphragm. Each turbine diaphragm 6 has a ring of steam nozzles circumferentially extending about the inner and outer ring portions of the diaphragm. The radial position of the steam nozzles in any particular diaphragm is at substantially the same as the radial position of the ring of turbine blades in its associated rotor. The function of each steam nozzle in a stationary diaphragm is to receive steam from the passageways in the outer turbine casting and to physically direct this steam against the rotating blades 8 of its associated rotor. Preferably, the steam is directed against the rotating turbine blades at an angle selected to maximize momentum transfer to the turbine shaft and rotor assembly.

As shown in FIGS. 2 through 3, each turbine stage of the first illustrative embodiment includes a stationary diaphragm 6 comprising: an outer ring portions 6A seated in complementary joint 7 in the outer turbine casting 2; a ring of steam directing nozzles 10 supported within the outer ring portion; and an inner ring portion 6B contained within the nozzle ring. The turbine stage includes rotor structure 4 comprising: an inner ring portion 4A attached to turbine shaft 5; a plurality of blades (i.e., buckets) 11 each being fixedly attached to inner ring portion 4A; and a circumferentially extending shroud band (i.e., blade cover) 12, which is secured to the tenon of each turbine blade. When so assembled, the blades and the shroud band 12 are generally disposed within or about a plane centrally passing through such subcomponents. Hereinafter this plane shall be referred to as the "principal plane" of the rotor and will be used for referencing the location and extension of the bristles used to realize the brush seal of the illustrative embodiment hereof. The rotating and stationary components comprising the various stages of the turbine are enclosed within the outer turbine casting A.

In each turbine design of the present invention, adequate steam seals between each stationary diaphragm and its associated turbine rotor are provided using two distinct steam sealing mechanisms. The details of these steam sealing mechanisms will be described below.

Figure 2A:
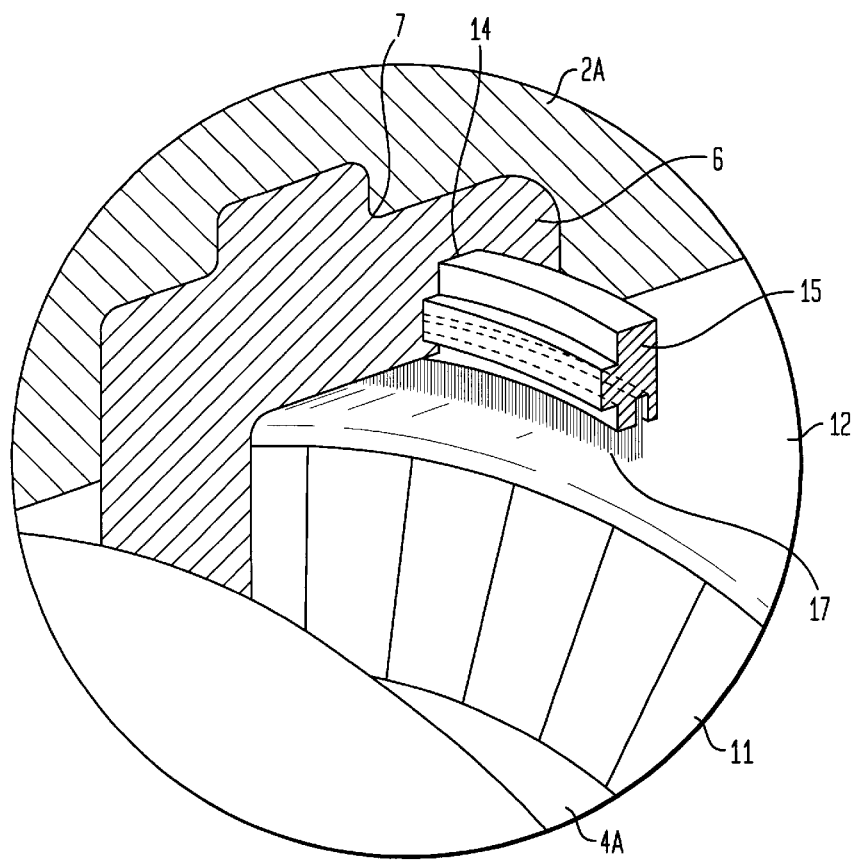
FIG. 2A is a cross-sectional view of a turbine stage of the present invention, showing the first illustrative embodiment of the spillstrip ring and the manner in which it extends from a diaphragm stationarily installed in the outer turbine casting, and establishes a continuous tip seal with the shroud band of its associated rotor.
Figure 7:
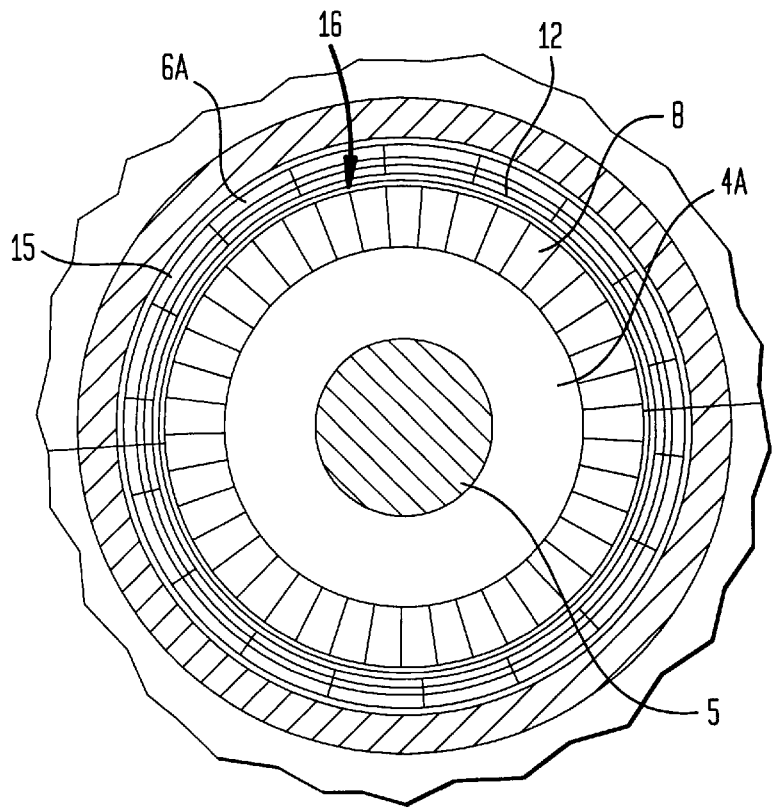
FIG. 7 is a cross-sectional diagram of a turbine stage according to the present invention, taken along line 7—7 in FIG. 3.

As shown in FIG. 2, spillstrip ring 13 of the first illustrative embodiment is seated in a complementary groove 14 formed in a spillstrip holding portion 6A that is formed as an extension on the subsequently downstream turbine diaphragm. In general, a large number of these spillstrip segment 15 are assembled together along this groove in order to construct a spillstrip ring 16, as best illustrated in FIG. 7. As shown in FIG. 2A, the spillstrip ring is constructed of fine metallic bristles 17 which are generally disposed in a plane substantially parallel to the principal plan of the associated rotor and extend in the direction of rotation thereof. While the spillstrip ring 16 is supported from the diaphragm by way of mated-groove structure 14 formed therein, it is understood that the method of attachment of this structure may, at any particular stage of the turbine, vary from embodiment to embodiment of the present invention.

Figure 4:
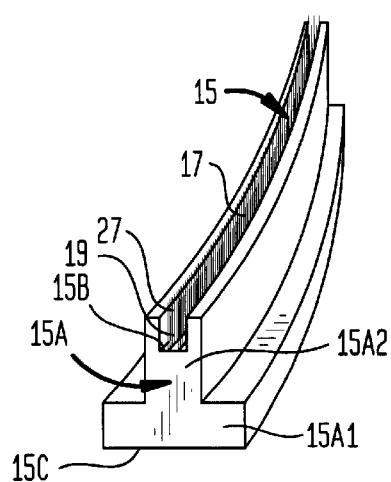
FIG. 4 is a perspective view of the first illustrative embodiment of the spillstrip of the present invention, showing the T-shaped cross-sectional dimensions of its body portion, and a single row of brush segments of the present invention embodied therein.

In FIG. 2A and FIG. 4, the first illustrative embodiment of the spillstrip segment of the present invention is shown. As illustrated therein, each spillstrip segment 15 comprises a body portion 15A having a number of substructures, namely: horizontally disposed cross piece 15A1, which extends longitudinally, and a vertical disposed body member 15A2, which extends substantially perpendicularly from horizontal cross piece 26. As shown, the horizontally disposed crosspiece and the vertically disposed body member form the T-shaped cross section of the spillstrip, which is precisely matched for seating in complementary groove 14 formed in diaphragm 6. As shown in FIG. 4A, a groove 15B is formed along the length of vertically disposed body member 15A2, for receipt of brush segment or strip 19 according to the present invention. Each brush segment has a pack of fine metallic bristles 20 whose end tips 20A form a bristle tip surface 21 having a radius of curvature $r_b$ that corresponds to the radius of curvature $r_g$ of the bottom surface of groove 15B. Likewise, the radius of curvature $r_b$ of the bristle tip surface 21 corresponds to the radius of curvature $r_r$ of the outer surface of the rotor. Methods for manufacturing spillstrips with such radius of curvature requirements will be described in detail hereinafter.

Figure 5:
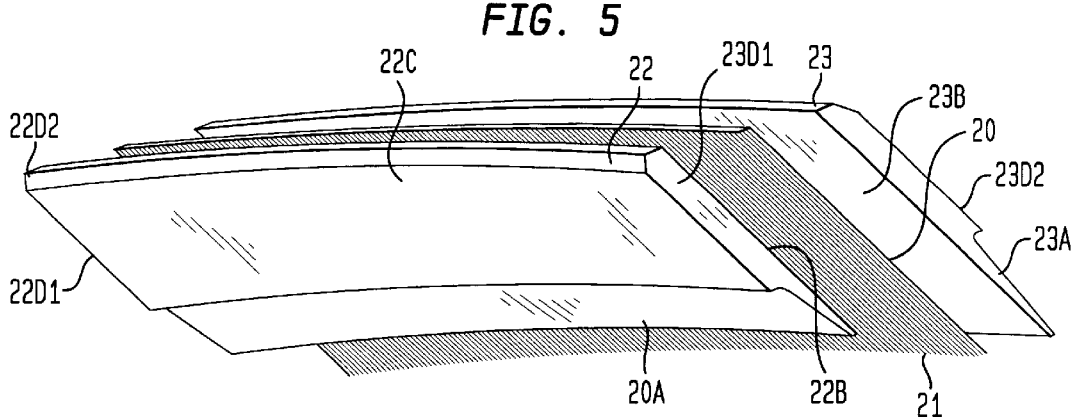
FIG. 5 is an exploded view of a first illustrative embodiment of the brush segment (i.e., strip) according to the present invention.
Figure 5A:
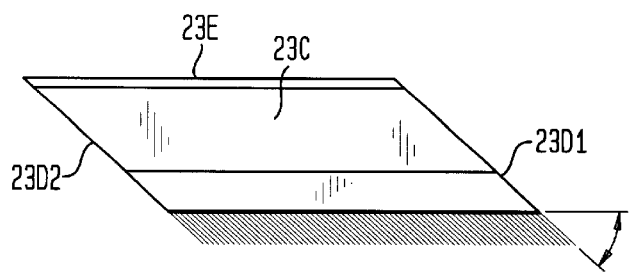
FIG. 5A is an elevated side view of the first illustrative embodiment of the brush segment of the present invention shown in FIG. 5.
Figure 5B:
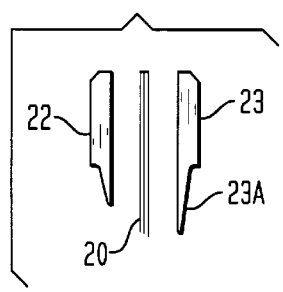
FIG. 5B is an exploded side view of the brush segment shown in FIG. 5.
Figure 5C:
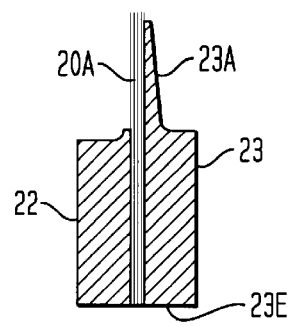
FIG. 5C is a cross-sectional view of the spillstrip of the present invention.

As best shown in FIGS. 5 through 5C, the packet of fine metallic bristles 20 are bound and secured together between a pair of metal plates 22 and 23, respectively. Typically, the diameter of each bristle is in the range of about 0.003 to 0.008 inches, while the width of the bristle packet will typically be in the range of 0.040 to about 0.060 inches. It is understood, however, that this parameter may vary from embodiment to embodiment of the present invention. As shown, back plate 23 has a narrow tapered portion 23A that projects upwardly behind the bound bristle pack 20 below the length of the projection of the bristles above the upper end 23A of the front plate 22. Typically, the length of the bristle projection above (i.e., beyond) narrow tapered portion 23A will be in the range of about 0.030 to about 0.100 inches, although this parameter may also vary from embodiment to embodiment of the present invention. In general, this length parameter should be selected in order to achieve: (1) an adequate seal; (2) excellent leakage reduction characteristics; and (3) excellent rubbing characteristics should rubbing occur. While the perimetrical portions of the front and back plates are machined to highly planar surfaces, to facilitate joining (TIG) and welding or brazing of these plates to form a unitary segment structure, the interior portions of the inner surfaces 22B and 23B of these plates can be channeled in a surface incised manner. The function of the incised channel is to allow the bristle pack 20 to be tightly received therein prior to the welding or brazing operation. The outer surfaces 22C and 23C of the plates 22 and 23 respectively are machined in a manner to match the geometry of the groove 15 formed in the longitudinal portion of the spillstrip body portion by, for example, press-fitting the assembled brush segment into groove 15B using conventional techniques.

As shown in FIG. 5, the end edges 22D1 and 22D2, of the front plate and end edge 23D1 and 23D2 of the back plate are machined to a planar surface that extends in the direction of pack of bristles bound between plates 22 and 23. In an illustrative embodiment, where the radius of curvature of the outer surface of the rotor is about 15 inches, the angle formed between the bristles and the lower surfaces of the front and back plates 22 and 23 is about 45 degrees, but may vary from about 30 to about 55 degrees depending on the size of the associated rotor. Typically, the length of each brush segment will be significantly shorter than the length of the spillstrip segment into which the brush segments are installed. As discovered, this allows a single (fixed-length) brush segment to be used to construct brush-type spillstrip ring segments as well as packing ring segments designed for wide range of turbine rotor diameters. The method for arriving at a suitable length for each constituent brush segment that satisfies such design and manufacturing considerations will be described in great detail hereinafter with reference to FIGS. 11A through 12B.

Figure 2B:
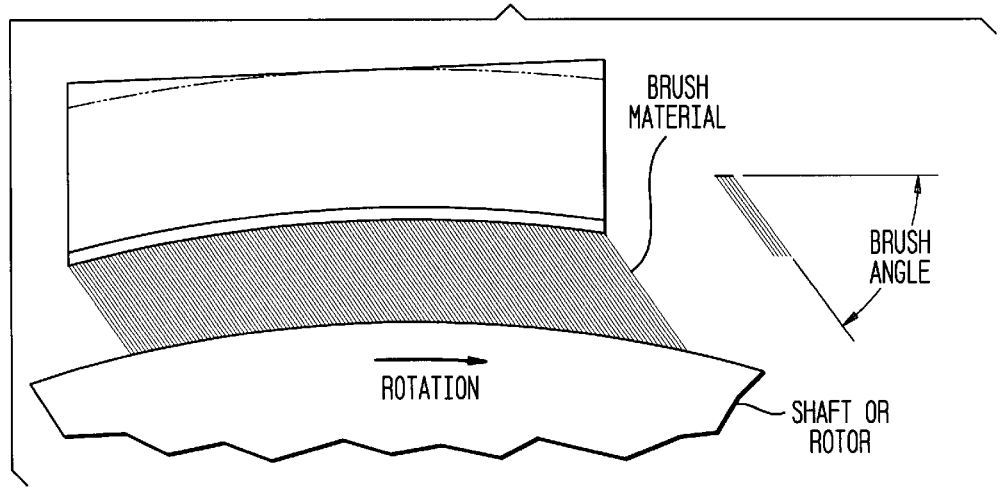
FIG. 2B is a schematic diagram illustrating that the bristles associated with the spillstrip ring of the first and second illustrative embodiments of the present invention extend in the direction of rotation of the associated rotor.
Figure 6:
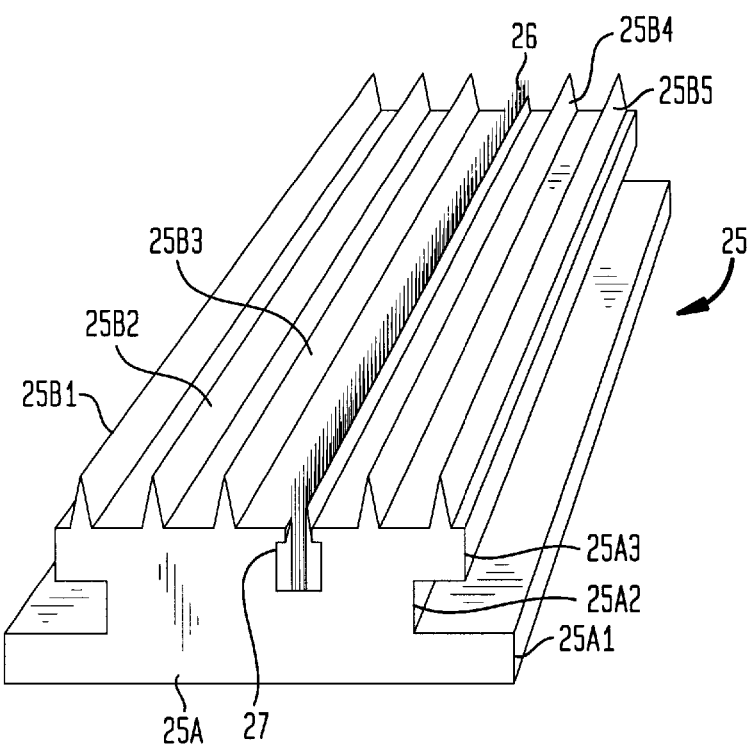
FIG. 6 is a perspective view of the second illustrative embodiment of the spillstrip of the present invention, showing the T-shaped cross-sectional dimensions of its body portion, a plurality of rows of rigid fins extending therefrom, and a single row of brush segments of the present invention disposed therebetween.

In FIG. 6, the second illustrative embodiment of the spillstrip segment hereof is shown. As in the case of the first illustrative embodiment, a large number of these spillstrip elements 25 are assembled together in an edge-to-edge manner in order to construct a continuously spillstrip ring similar to the spillstrip ring 26 shown in FIG. 7. As shown in FIG. 6, each spillstrip segment 25 comprises a body portion 25A having a number of substructures: a first horizontally disposed cross-piece portion 25A1 having a longitudinal extent; a vertically disposed body member 25A2 extending substantially perpendicularly from the cross-piece portion 25A1; and a second horizontally disposed cross-piece portion 25A3 having a longitudinal extent. As shown, each spillstrip segment further includes: multiple rows of fin-like projections 25B1 to 25B5 that extend upwardly from the top surface of the second cross-piece portion 25A3; and at east one brush-type projection 26 running between a pair of fin-like projections 25B3 and 25B4, formed from a plurality of the brush segments 27 shown in FIGS. 5 through 5B, whose bristle elements reside in a plane parallel to the principal phase of the rotor and extend in the direction of rotation thereof as shown in FIG. 2B. The side walls of each fin-like projection 25B1 and 25B2 are tapered and converge to a tip portion 25C having a continuous edge that also extends along the longitudinal extent of the body portion 25A. In the illustrative embodiment, each fin-like projection is machined from a single piece of metal It is understood, however, that the fin-like projections of the spillstrip can be fabricated from a different piece of metal than used to fabricate vertically disposed body portion thereof. Such fin-like projections can then be press-fitted into a groove formed along the top surface of second cross-piece 25A3, in a manner similar to the way the brush segments 27 hereof are installed within the spillstrip body portion. In this embodiment of the present invention, the tip surface of the fin-like projections and the tip surface of the brush segments 27 each have a radius of curvature that corresponds with the radius of curvature of the shroud band of the associated rotor. In other embodiments, multiple rows of brush segments 27 can be installed within additional grooves formed in the spillstrip body portion. In such alternative embodiments, the bristles of each such brush segment will reside in planes substantially parallel to the principal plane of the rotor and extend in the direction of rotor rotation, as illustrated in FIG. 2B.

Figure 8:
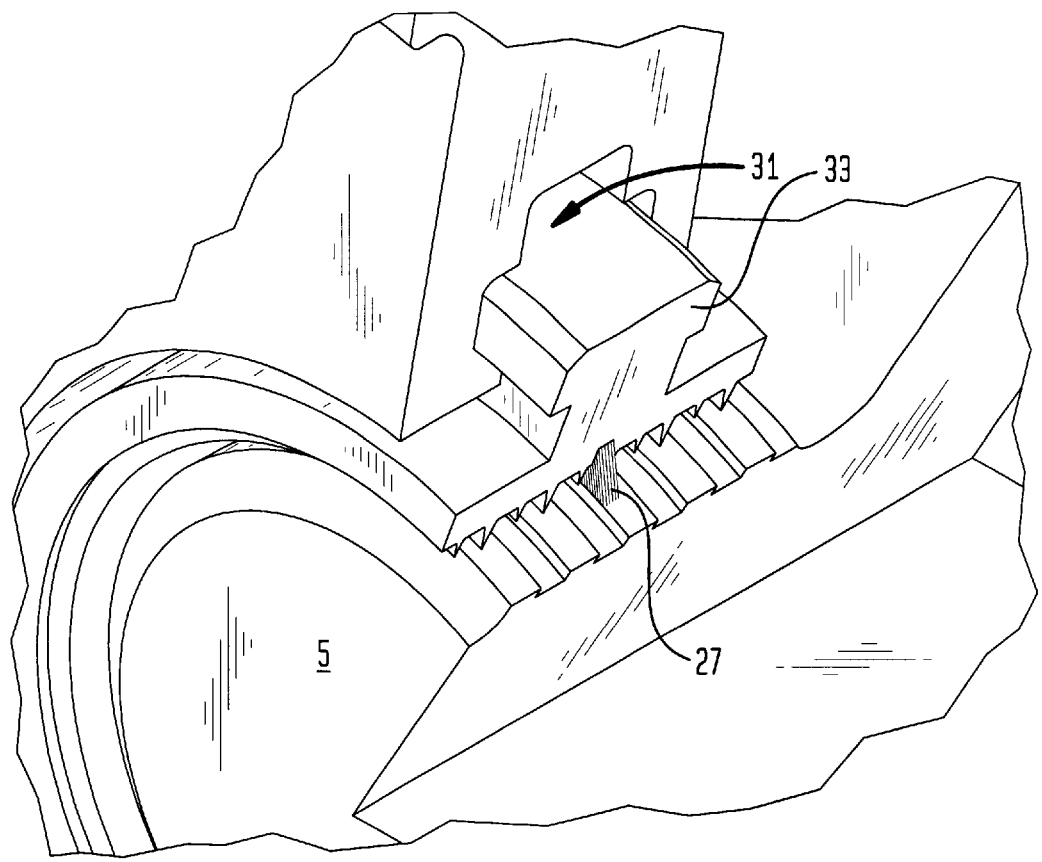
FIG. 8 is a perspective, partially fragmented view of a turbine stage of the present invention, showing a portion of the first illustrative embodiment of the retractable packing ring of the present invention and the manner in which it is supported by the turbine diaphragm to form a continuous labyrinth seal with the rotor shaft.
Figure 8A:
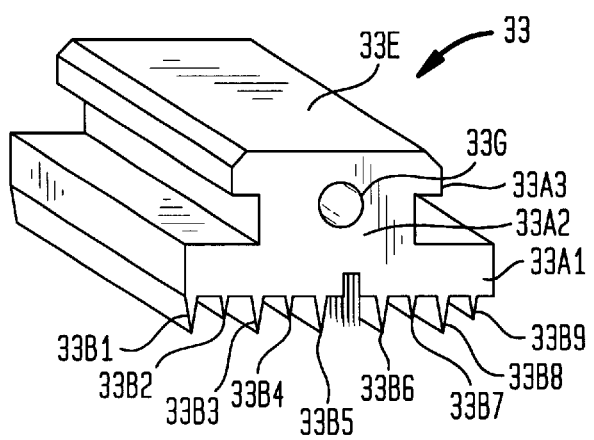
FIG. 8A is a first perspective view of the second illustrative embodiment of the retractable packing seal segment, showing the T-shaped cross-sectional dimensions of its body portion, the plurality of rows of rigid fins extending along the length thereof, and the single row of brush segments of the present invention embodied therein.
Figure 8B:
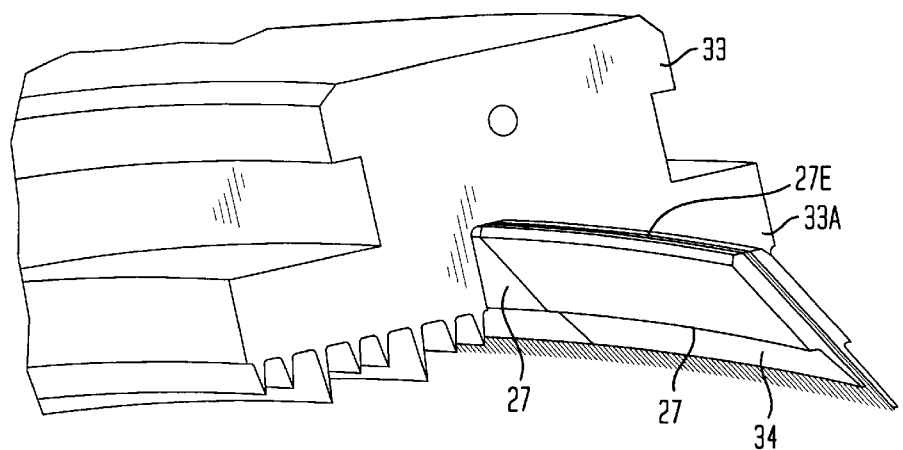
FIG. 8B is a second perspective view of the first embodiment of the retractable packing ring segment of the present invention.
Figure 9:
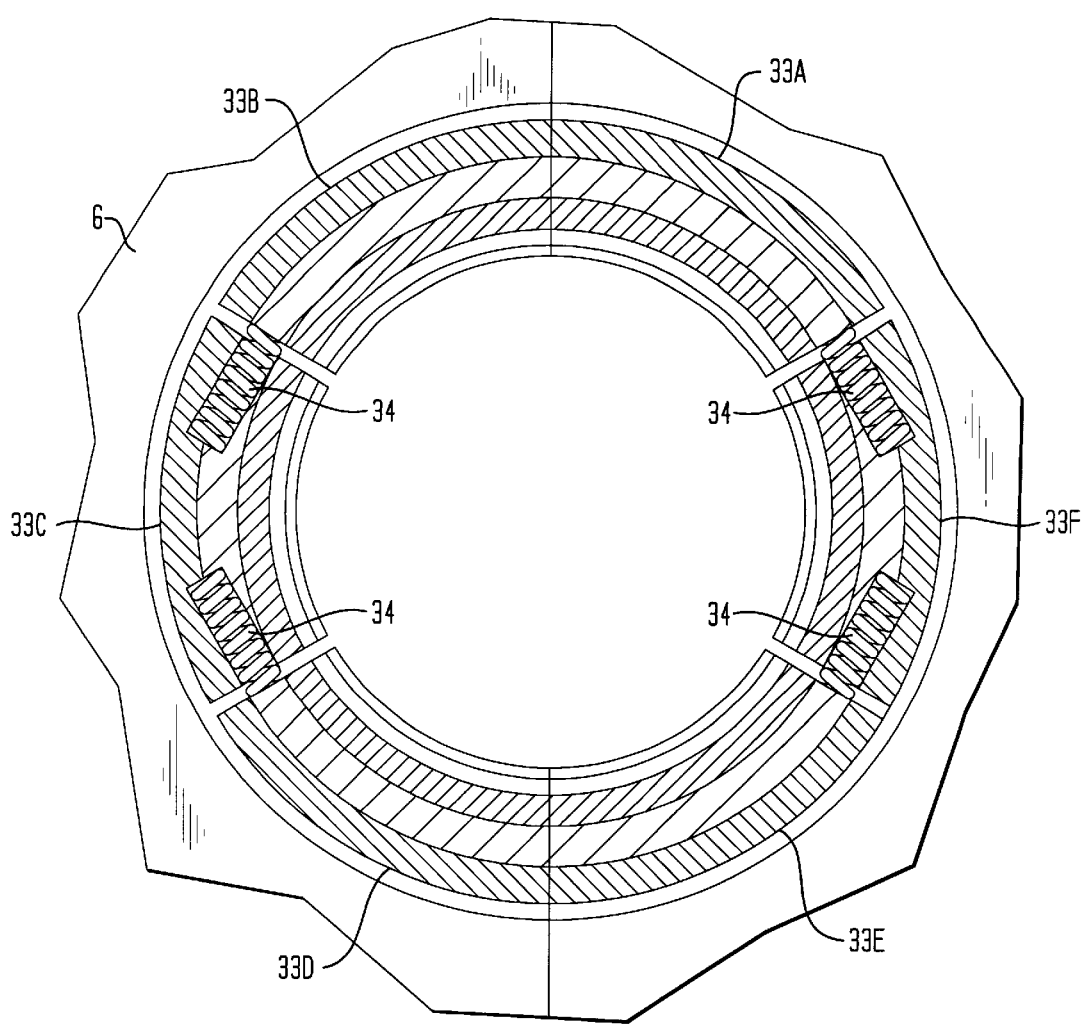
FIG. 9 is a cross-sectional view of the retractable segmented packing ring of the present invention installed about the rotor shaft, taken along line 9—9 of FIG. 3.

In FIGS. 2 and 8, a portion of a segmented retractable packing ring 30 of the first illustrative embodiment is shown seated in a complementary groove 31 formed in the inner ring portion 6B of a turbine diaphragm 6. The function of the retractable packing ring 30 is to form a continuous labyrinth-type seal between the inner ring portion 6B of diaphragm and the outer surface of the turbine shaft 5. As best illustrated in FIGS. 8A, 8B and 9, the packing ring structure 30 of the illustrative embodiment comprises six packing ring segments 33A, 33B, 33C, 33D, 33E and 33F coupled together by coil springs 34 and the like. Alternative packing ring arrangements which may be used to practice the brush seal designs of the present invention, are described in U.S. Pat. Nos. 4,436,311 and 5,395,124 of Brandon, incorporated herein by reference.

Figure 8C:
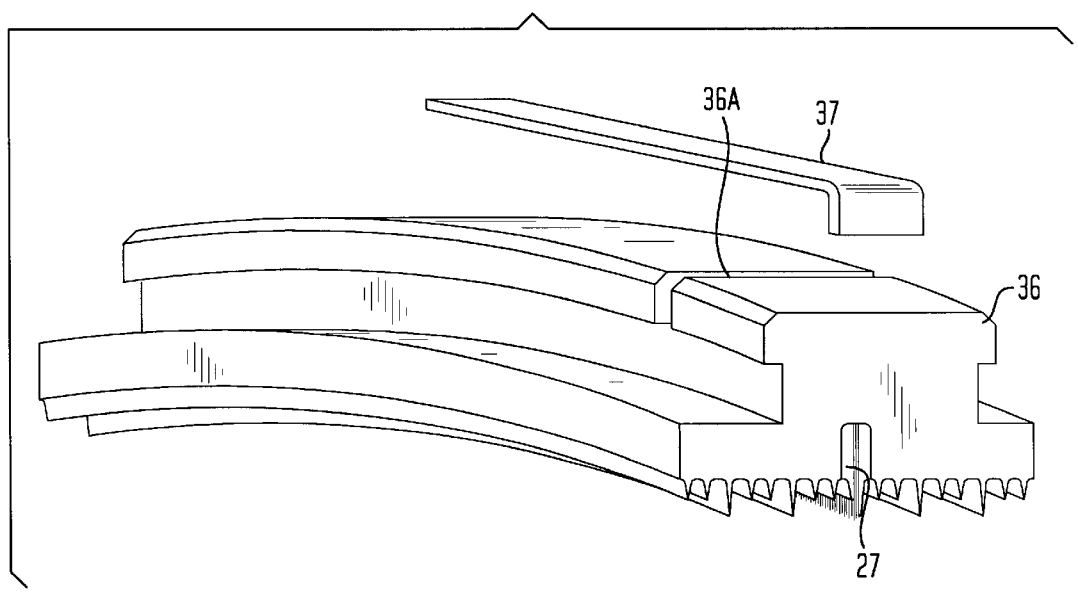
FIG. 8C is a perspective view of a non-tractible type packing ring segment employing the brush segments of the present invention.

In this illustrative embodiment, each packing ring segment 33 comprises a body portion a first horizontal, extending portion 33A1, a vertical extending portion 33A2, and a second horizontal extending portion 33A3, contributing to the segments T-shaped cross-section as shown in FIG. 8A. In addition, each packing ring segment comprises a plurality of rows of rigid fin-like projections 33B1 through 33B9 extending along the length of its body portion; and the single row 33C of brush segments 27, (shown in FIGS. 5–5C) extending along the body portion of the packing ring segment. As best shown in FIG. 8C, the row of brush-segments, 27C, is realized by installing a number of premanufactured brush segments 27 within a groove 33D that has been machined into the vertically disposed body portion 33A2 of the segment, preferably between a pair of fin rows. Each brush segment 27 within the retractable packing ring has a packet of metallic bristles which reside in a plane substantially parallel to the principal plane of the associated rotor and extend in the direction of rotation of the turbine shaft. The tips of these bristles terminate along a bristle tip surface 34 having a radius of curvature $r_b$ that corresponds to the radius of curvature $r_f$ of the outer surface of the turbine shaft. Likewise, the radius of curvature of the rear surface 23E of the brush segment corresponds to the radius of curvature of the bottom surface 33D1 of groove 33B, shown in FIGS. 8A and 8C. Methods for manufacturing packing segment; with such radius of curvature requirements will be described in detail hereinafter.

In order to create a net biasing force in the radially outward direction (away from the turbine shaft), adjacent packing ring segments of the illustrative embodiment, namely 33A and 33F, 33F and 33E, 33D and 33C, and 33C and 33D, are mechanically coupled by a coil-type spring 34 which is fitted into a cylindrical bore 33G formed in the side edge surface of each such packing ring segment, as shown in FIGS. 8A and 9. Collectively, these coil springs cooperate to produce an array of forces that bias the packing ring segments in a radially-outward direction. During the start-up phase of turbine operation, when the rotor has the greatest tendency to wobble about the rotational axis of the turbine shaft (e.g., undergo transient radial displacements), the rows of fin-like projections associated with the packing ring are located at their maximum distance from the corresponding surfaces associated with the turbine shaft, while the tips of the brush segments maintain contact with the surface of turbine shaft. As the speed of the turbine increases, the pressure of steam behind each packing ring segment forces the packing rings to move radially inward against the outwardly directed spring biasing forces, causing the fin-like projections of the packing ring to move closer towards the opposing surfaces on the turbine shaft, thereby increasing the quality of the labyrinth-type steam seal. Based on the expected load characteristics at each turbine stage, the spring characteristics will be selected in a manner well known in the art. In other embodiments, a different number of packing ring segments may be used, with different coupling mechanisms used to create biasing forces for segment retractability.

In FIG. 8C, an alternative embodiment of the packing ring segment of the present invention 36 is shown. This packing ring segment 36 is non-retractible and employs a flat spring 37 to secure the packing ring segment in its mounting groove 31. As shown in FIG. 8C, a groove 36A is formed in the body portion of the segment, for receipt of end portion 37A of flat spring 37. In all other respects, packing ring segment 36 is similar to packing ring segment 33, thus embodying the brush-sealing feature of the present invention.

Referring to FIG. 10, a method for manufacturing the brush segments 27, spillstrip segments 15, 25 and packing ring segments 33 of the present invention will now be described below.

As indicated at Block A in FIG. 10, the first step of the generalized method involves premanufacturing the front and back plates 22 and 23 of each brush segment 27 as shown in FIG. 5A. These plates can be milled, molded or forged using techniques well known in the art. The size and length of these plates can be determined using the "drop study" information tables set forth in FIGS. 11A and 11B. The use of these information tables will be described in detail hereinafter.

As indicated in Block B of FIG. 10, the elongated bristles of a brush pack are loaded within the incised channels formed on the interior surface of the plates. Automated machinery can be used to hold the plates 22 and 23 in place while a packet of bristles 20 are arranged between the plates. After the packet of bristles have been arranged between the front and back plates, the plates are brought together and welded, as indicated in Block C in FIG. 10. Typically, these assembled brush segments will be manufactured in several standard arch lengths that can be used to construct a wide range of spillstrip segments and packing ring segments in accordance with the principles of the present invention. At Block D, the proper size brush segments are selected for manufacturing the segmented spillstrip ring or packing ring under design.

At Blocks E through G, packing ring segments or spillstrip ring segments are manufactured by a subprocess that is separate from the subprocess specified at Blocks A through C, described above. At Block E, the design parameters for the spillstrip ring or packing ring are acquired using measurement techniques well known in the art. At each turbine stage of interest, the design parameters to be acquired for spillstrip ring designs will typically include: the radius of curvature of the rotor; the radius of curvature of the surface of the groove in diaphragm receiving the spillstrip ring segments; etc. The design parameters to be acquired for packing ring designs will typically include: the radius of curvature of the turbine shaft and its packing ring surfaces mounted thereabout; the radius of curvature of the surface of the groove in the diaphragm receiving the packing ring segments; the pitch and number of labyrinth steps (lands) on the turbine shaft; the clearance existing between the turbine shaft and packing ring; the "as found" wear of the packing ring fins (teech); etc. Once collected, such measurements are recorded for subsequent use in manufacturing the spillstrip and packing ring segments of the present invention.

As indicated at Block F, the design parameters acquired at. Block E for the spillstrip ring design are then used to manufacture the body portion of each spillstrip ring segment.

Likewise, the design parameters acquired at Block E for the packing ring design are then used to manufacture the body portion of each spillstrip ring segment. Conventional CNC milling equipment can be used to manufacture the body portions of the spillstrip segments and the packing ring segments.

Figure 9A:
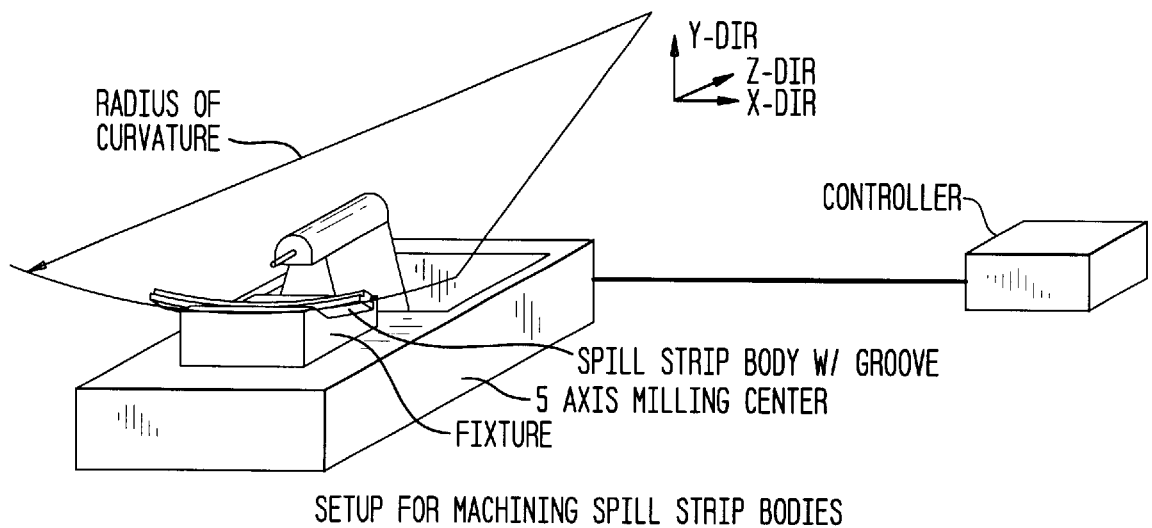
FIGS. 9A and 9B are schematic diagrams showing computer numerically controlled (CNC) machinery for use in manufacturing brush segments, spillstrip segments, and packing ring segments; of the present invention.
Figure 9B:
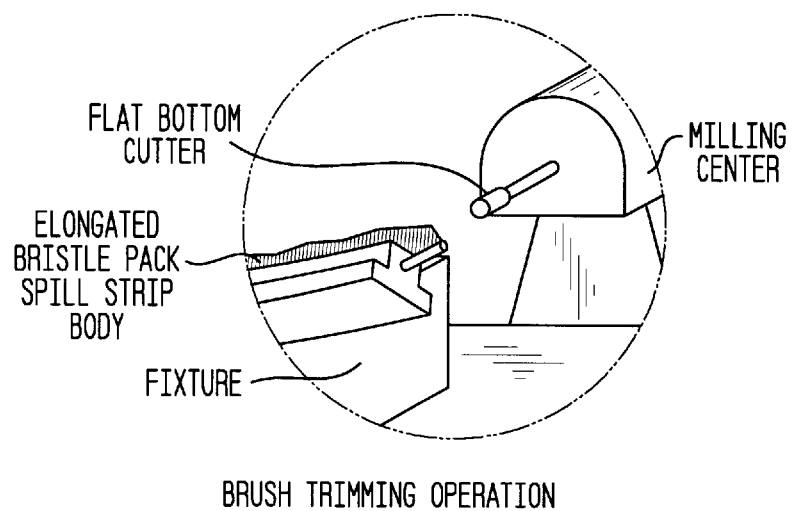

As indicated at Block G in FIG. 10, a groove is milled in the inner diameter of the spillstrip segment (or the packing ring segment) in order to accept brush segments manufactured at Blocks A through C, described above. The CNC milling equipment shown in FIGS. 9A and 9B can be used to machine the required radius of curvature surfaces into the spillstrip body portion.

This same equipment can be easily modified for milling surfaces in the body portion packing ring segments according to the present invention. As indicated at Block H, manufactured brush segments are inserted into the groove milled into the body portion of the spillstrip segments (or packing segments as the case may be). This step of the manufacturing process can be carried out using robotic machinery and the like. Once inserted within the groove of the body portion of the spillstrip segment (or packing ring segment), the individual brush segments are welded into place, as indicated at Block I. The assembled spillstrip segments are then installed into a trimming fixture, with a clamp stiffener disposed about the bristles, as indicated at Block I. As indicated at Block K, the end portion of the bristles are trimmed using a cutter so that the tip portions thereof conform to a surface having a radius of curvature that corresponds with the radius of curvature of the shroud band of the rotor at the applicable turbine stage. The apparatus illustrated in FIGS. 9A and 9B can be used to carry out such brush trimming operations. In the case of spillstrip segment manufacture, the radius of curvature associated with the cutting surface of the milling machine is set to the radius of curvature of the shroud band of the rotor. In the case of packing ring segment manufacture, the radius of curvature associated with the cutting surface of the milling machine is set to the radius of curvature of the corresponding surface on the turbine shaft.

Figure 11A:
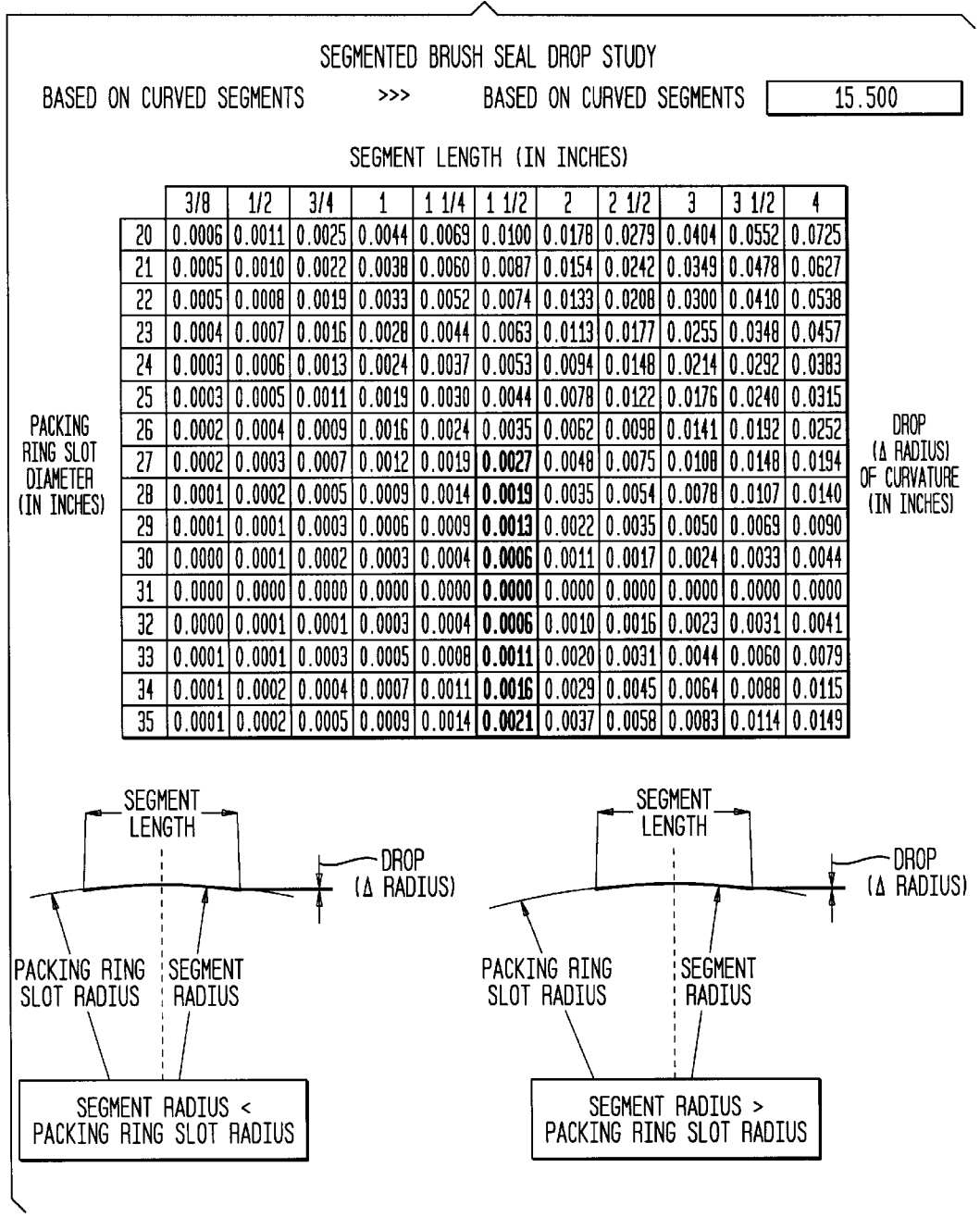
FIG. 11A is a table setting forth the results of a second study showing the change of radius of curvature (i.e., drop) as a function of (i) the change in the packing ring slot diameter for packing ring segments of a fixed radius of curvature (e.g., 11.5 inches) and (ii) the length of the packing ring segment.
Figure 11B:
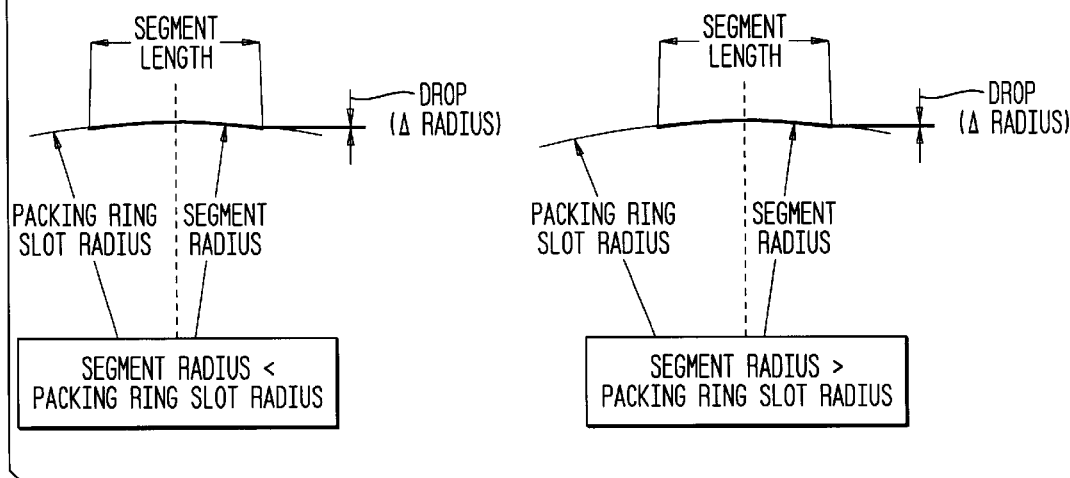
FIG. 11B is a table setting forth the results of a first study showing the change of radius of curvature (i.e., drop) as a function of (i) the change in the packing ring slot diameter for packing ring segments of a fixed radius of curvature (e.g., 15.5 inches) and (ii) the length of the packing ring segment.

In the information tables of FIGS. 11A and 11B, the results of a "drop" study for segmented brush seals are presented. As indicated by the computed "drop" measures listed in these information tables, a brush segment having a segment length of 1 ¼ inches and a 11.500 inch radius of curvature, can be used to create continuous brush seals with packing ring segments having radius of curvatures within the range of 20–27 inches. Similarly, a brush segment having a segment length cf 1 ½ inches and a 15.500 inch radius of curvature, can be used to create continuous brush seals within packing ring segments having radius of curvatures within the range of 28–35 inches. Thus, by virtue of the present invention, it is possible make and stock two size brush segments for use in realizing continuous brush-type labyrinth seals in retractable packing rings having radius of curvatures within the range of from about 20 to about 35 inches.

Figure 12A:
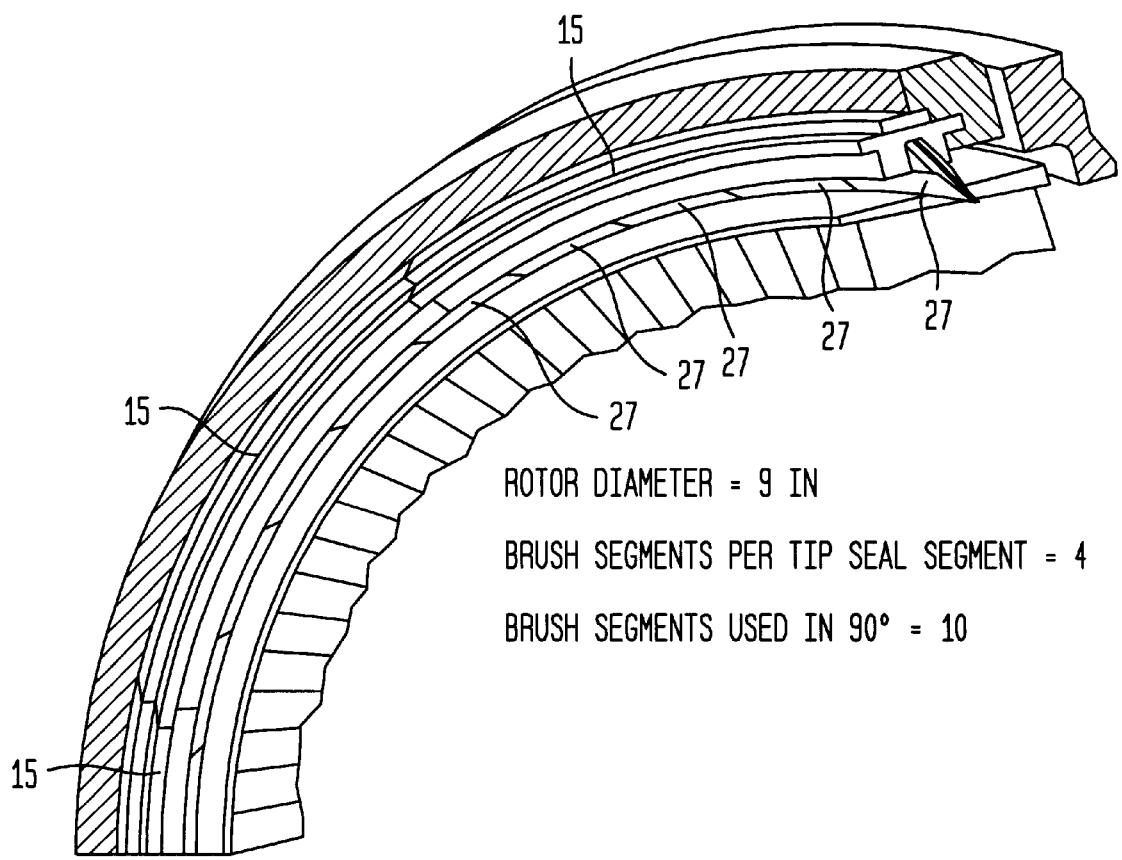
FIG. 12A is a schematic diagram showing a quarter portion of a tip seal formed about a rotor having a first diameter (e.g., 9 inches) using a first number (e.g., 10) of fixed-length brush segments (of the first illustrative embodiment) installed within a number of custom-length size spillstrip segments.
Figure 12B:
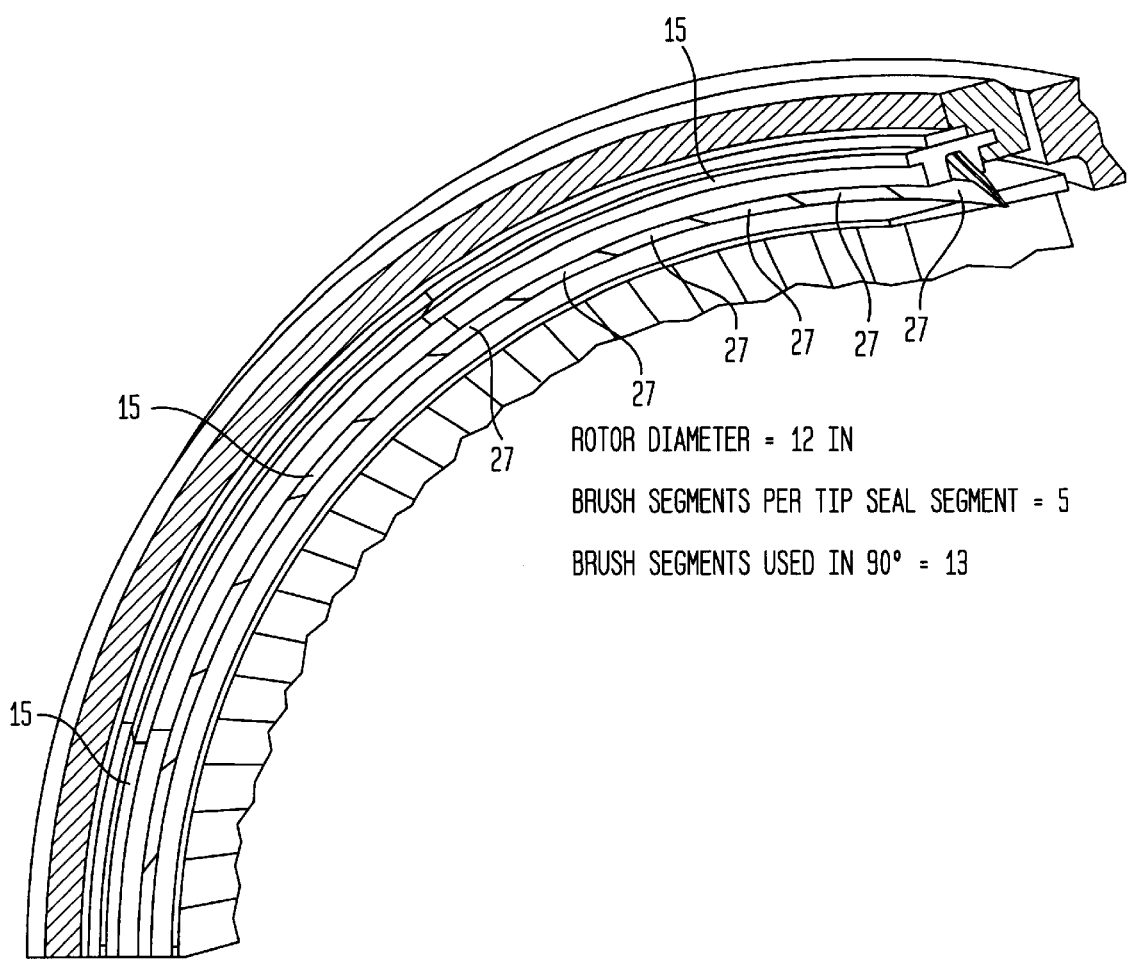
FIG. 12B is a schematic diagram showing a quarter portion of a tip seal formed about a rotor having a second diameter (e.g., 12 inches) using a second number (e.g., 13) of fixed-length brush segments (of the first illustrative embodiment) installed within a number of custom-length size spillstrip segments.

Similarly, a brush segment of fixed-size can be used to form continuous brush-type tip seals about turbine rotors having different size diameters. This application is illustrated in FIGS. 12A and 12B, wherein a single-size brush segment of the present invention is used to create continuous brush-type tip seals about two rotors having 9 inch and 12 inch diameters. The primary difference between these two designs is that more brush segments are required to form the brush seal about the 12 inch diameter rotor than the 9 inch rotor.

This technique should allow for a substantial reduction in the cost of manufacture of both spillstrips rings and packing rings.

Figure 13:
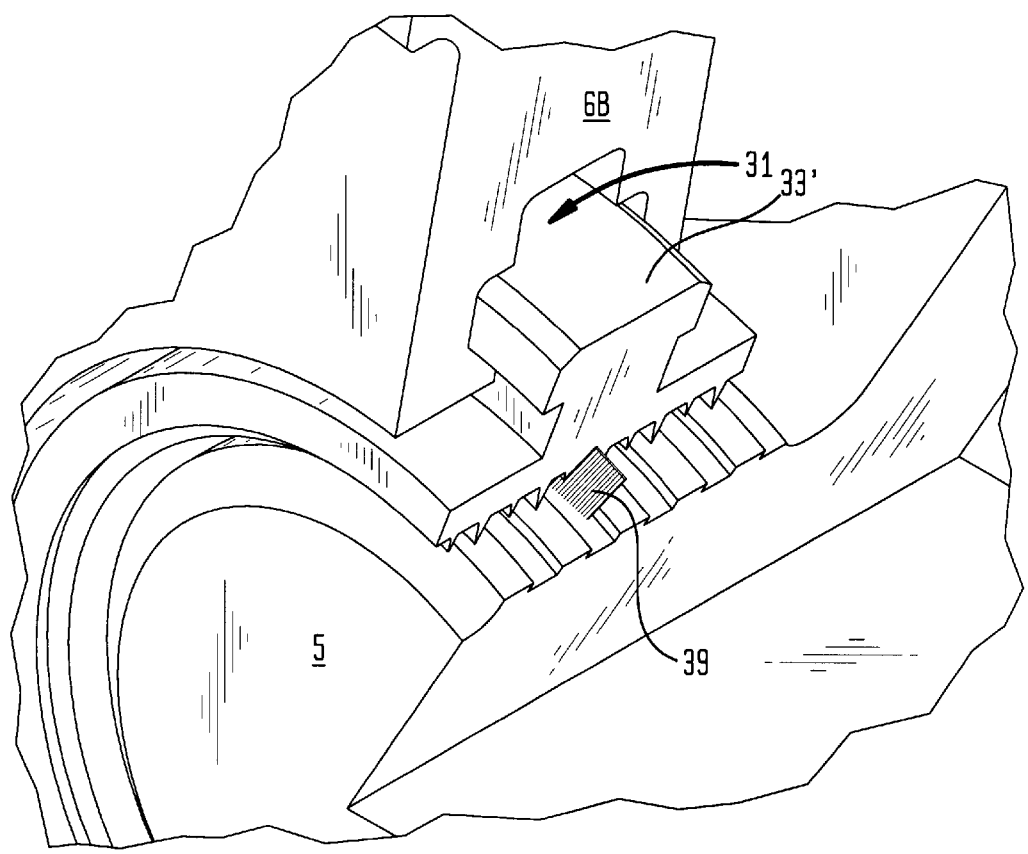
FIG. 13 is a perspective, partially fragmented view of a turbine stage of the present invention, showing a portion of the second illustrative embodiment of the retractable packing ring and the manner in which it is supported by the turbine diaphragm and forms a continuous labyrinth seal with the rotor shaft.
Figure 14:
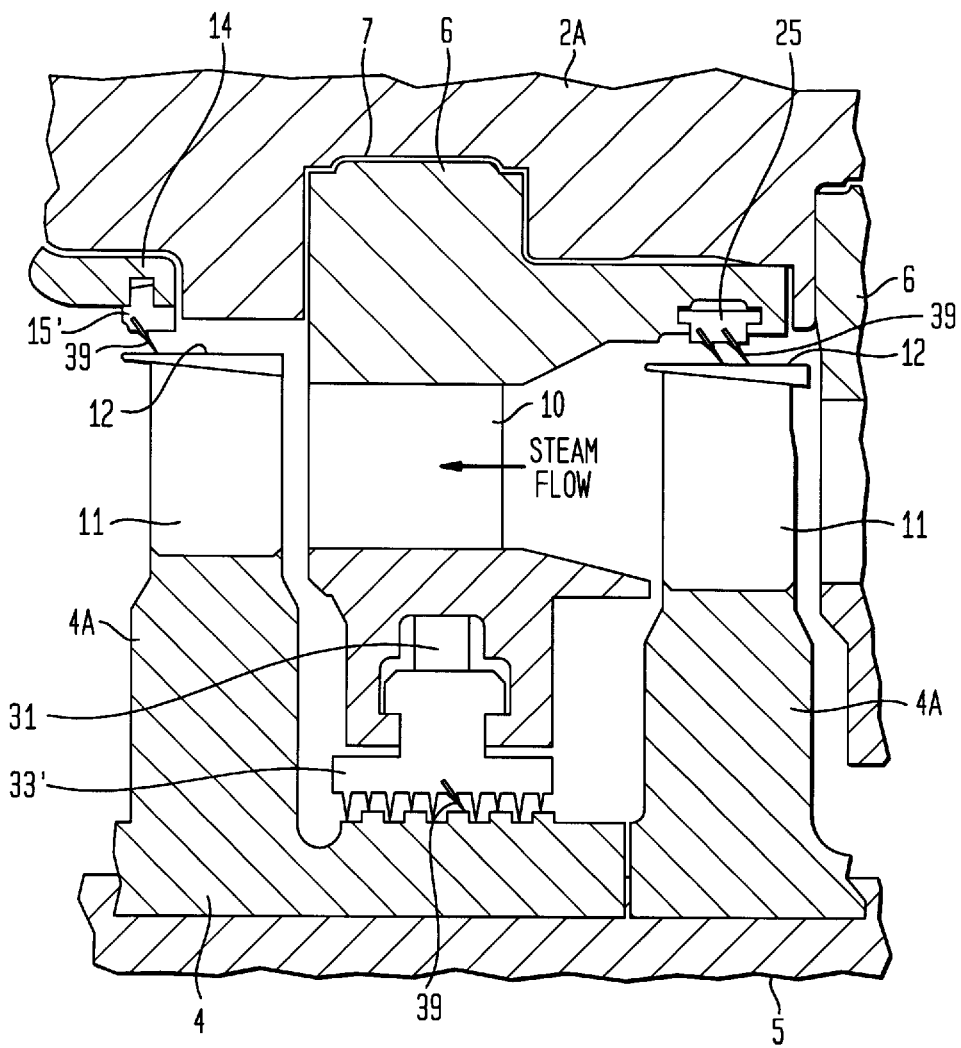
FIG. 14 is a cross-sectional view of a turbine stage of the present invention, showing the third and fourth illustrative embodiments of the spillstrip ring of the present invention and the third illustrative embodiment of the retractable packing ring of the present invention supported from the diaphragm to form a continuous tip seal(s) and labyrinth seal, respectively, within the turbine.
Figure 14A:
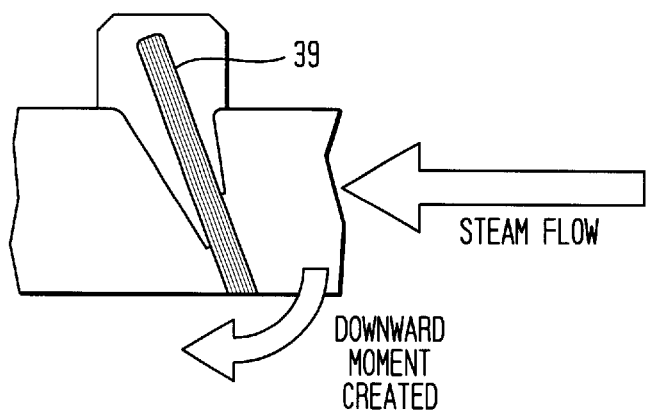
FIG. 14A is a schematic cross-sectional diagram of the second illustrative embodiment of the brush segment of the present invention, wherein the bristles thereof are forced downwardly by steam flow during turbine operation.

In FIG. 13, the second illustrative embodiment of the retractable packing ring of the present invention is shown. The primary difference between the packing ring segment 33' shown in FIG. 13 and the packing ring segment 33 shown in FIG. 8 is that the brush segments 39 installed within the body portion of each packing ring segment 33' are canted in the direction opposite of steam flow, that is, each bristle is disposed at an acute angle with respect to the principal plane of the associated rotor and extends substantially within the plane formed by a radius of the rotor and the axis of rotation of the rotor, as best illustrated in FIGS. 13, 14 and 14A. Also, in the alternative brush seal design of FIG. 13, the bristles within each brush segment extend in a radially inward direction, rather than in the direction of rotor rotation as shown in the case of the brush design of FIGS. 5 through 5B. The advantage of this brush seal design is that when the steam pressure within the turbine stage increases, the steam pressure forces the tips of the bristles against the rotor shroud band surface, thereby increasing the steam seal. As indicated in FIG. 14, the canted brush seal design can be implemented in either a spillstrip ring structure or a (retractable or non-retractable) packing ring structure, as shown in FIG. 14A. In the turbine design shown in FIG. 14, the third embodiment of the spillstrip segment 15', mounted on the lower pressure side of the illustrated turbine stage, includes a single row of canted brush segments installed within the body portion of the spillstrip ring. The fourth embodiment of the spillstrip segment 25', mounted on the higher pressure side of the turbine stage, includes a pair of canted brush segment rows installed within the body portion of the spillstrip ring.

As shown in FIG. 14, each retractable packing ring segment of the second illustrative embodiment 33' has a single row of canted brush segments 39 disposed between a plurality of rows of rigid fins vertically extending from the body portion of each packing ring segment. The bristles in each packing ring segment 33' extend in a radially inward direction and are canted in the direction opposite of steam flow, as described above In the third illustrative embodiment of the retractable packing ring 33", shown in FIG. 15, each row of fins along the packing ring segment is realized by a row of canted brush segments 39, as described above.

Figure 16:
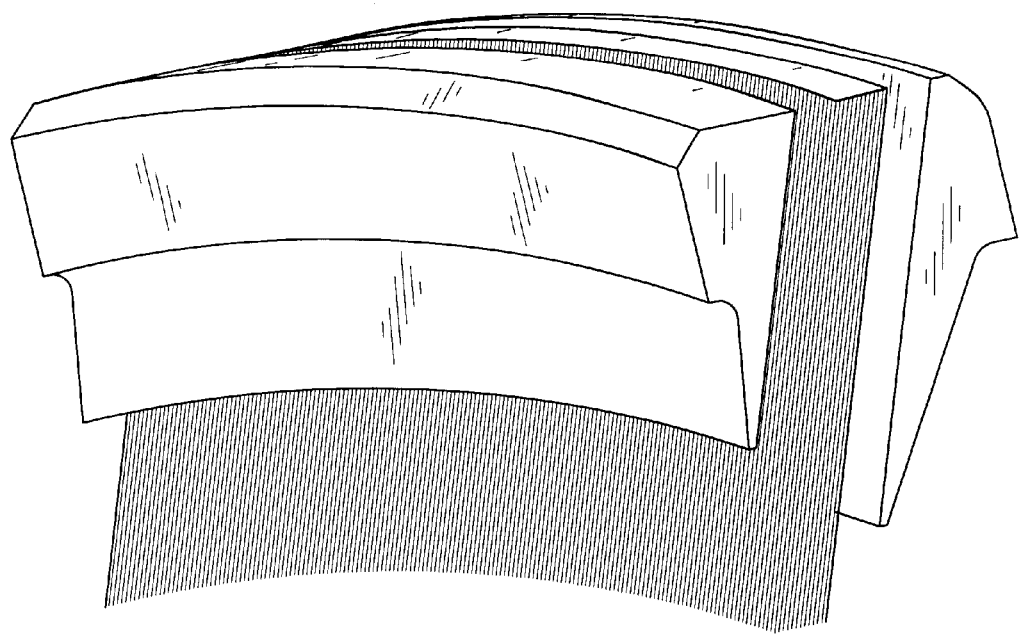
FIG. 16 is a perspective exploded view of a second illustrative embodiment of the brush segment of the present invention, wherein its bristles extend at an angle with respect to the principal plane of the rotor when installed within the turbine system.
Figure 16A:
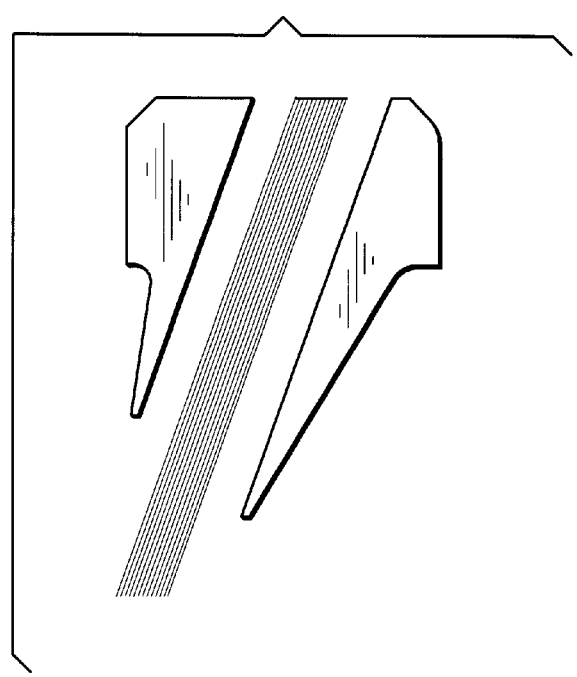
FIG. 16A is a cross-sectional exploded diagram of the brush segment of FIG. 16, showing its bristles (brush pack) being disposed between its front and back plates.

In FIG. 16, the design and construction of brush segment 39 of the present invention is illustrated. As shown in FIG. 16A, a packet of bristles (e.g., brush pack) is disposed between the interior surface front and back plates 41 and 42, respectively. In this embodiment of the present invention, each bristle is arranged substantially perpendicular to the bottom edge surface 39A of the assembled brush segment, as illustrated in FIG. 16. This ensures that the bristles will reside within a plane that radially extends through the associated rotor and along the axis of rotation of the shaft when installed within the body portion of the spillstrip, while extending in the opposite direction of steam flow (e.g., against the pressure gradient). The front and back plates 41 and 42 are welded together to form a unitary structure. As shown in FIG. 16A, the packet of bristles are disposed at an acute angle with respect to the bottom edge surface 41A of plate 41. This ensures that the bristles are canted with respect to the principal plane of the rotor when installed within the body portion of the spillstrip ring.

Figure 17:
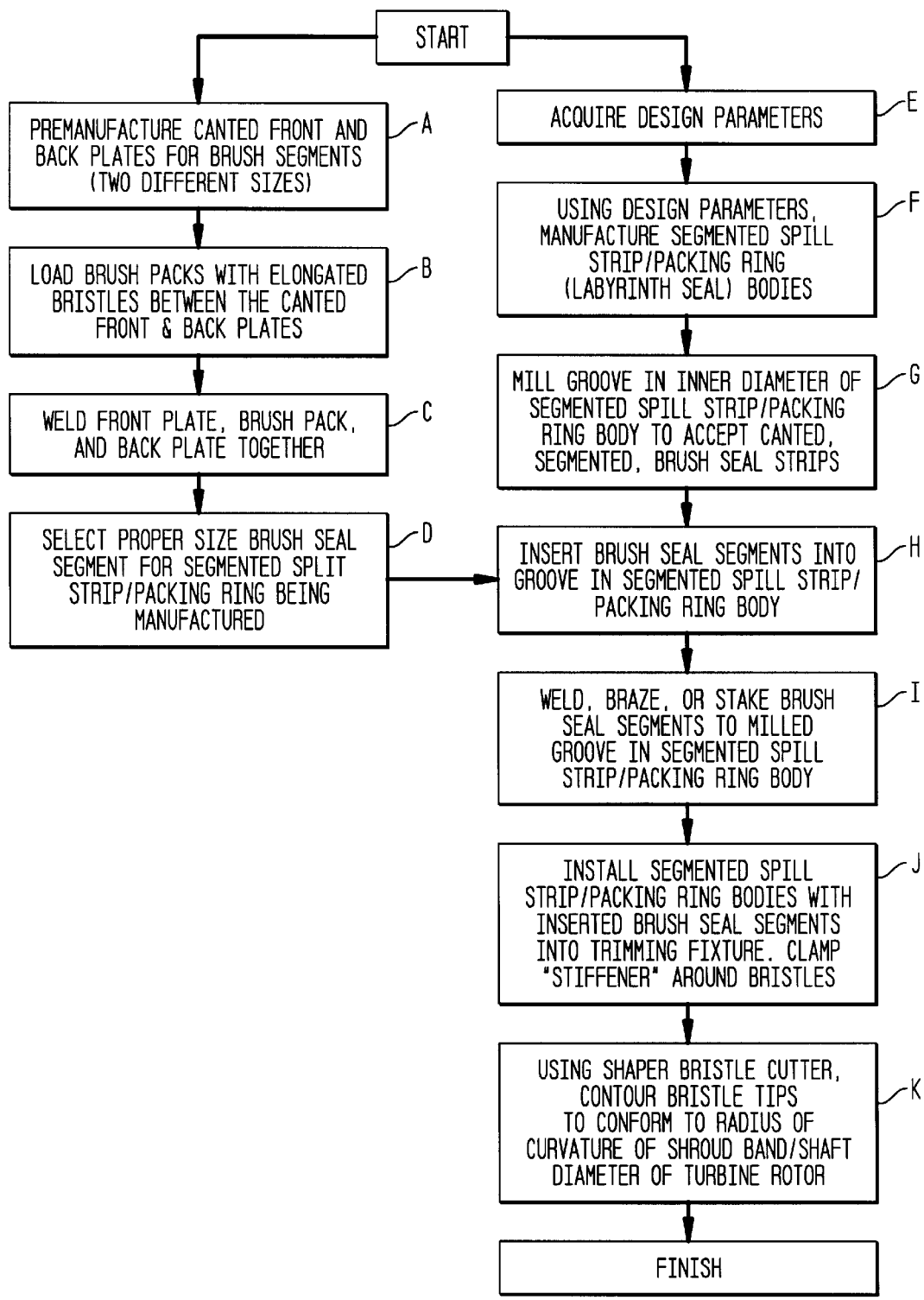
FIG. 17 is a flow chart setting forth the sets involved in manufacturing brush segments shown in FIG. 17, as well as spillstrip ring segments and retractable packing ring segments incorporating the same.

Referring to FIG. 17, a method for manufacturing the canted-type brush segments 39, spillstrip segments 15' and 25', and retractable packing ring segments 33' and 33' incorporating the same, will now be described in detail below.

As indicated at Block A in FIG. 17, the first step of the generalized method involves premanufacturing canted front and back plates 41 and 42 shown in FIG. 16A. These plates can be milled, molded or forged using techniques well known in the art.

As indicated in Block B of FIG. 17, a packet of elongated metallic bristles are arranged between the interior surface of the plates 41 and 42. Automated machinery can be used to hold the plates in place while the bristle packet 40 is arranged therebetween. When the bristles are arranged between the plates, the plates are brought together and welded, as indicated in Block C in FIG. 17. Typically, these assembled brush segments will be manufactured in several standard arc lengths, which can be used to construct a wide range of spillstrip segments and packing ring segments according to the present invention. At Block D, the proper size brush segments are selected for manufacturing the segmented spillstrip ring or packing ring under design.

At Blocks E through G in FIG. 17, packing ring segments or spillstrip ring segments are manufactured by a subprocess independent from the subprocess specified at Blocks A through C, described above. At Block E, the design parameters for the spillstrip ring or packing ring are acquired using measurement techniques well known in the art. At each turbine stage of interest, the design parameters to be acquired for spillstrip ring designs will typically include: the radius of curvature of the rotor; the radius of curvature of the surface of the groove in the diaphragm receiving the spillstrip ring segments; the width of the rotor (wheel) shroud band; the clearance existing between the turbine shaft and spillstrip; the "as found" wear of the spillstrip fins (teeth); etc. The design parameters to be acquired for packing ring designs will typically include: the radius of curvature of the turbine shaft and its packing ring surfaces mounted thereabout; the radius of curvature of the surface of the groove in the diaphragm receiving the packing ring segments; the pitch and number of labyrinth steps (lands) on the turbine shaft; the clearance exiting between the turbine shaft and packing ring; the "as found" wear of the packing ring fins (teeth); etc. Once collected, such parameter measurements are recorded for use in manufacturing the spillstrip ring segments and packing ring segments of the present invention.

As indicated at Block F, the design parameters acquired at Block E for the spillstrip ring design are then used to manufacture the body portion of each spillstrip ring segment. Likewise, the design parameters acquired at Block E for the packing ring design are then used to manufacture the body portion of each spillstrip ring segment. Conventional CNC milling equipment can be used to manufacture the body portions of the spillstrip segments and the packing ring segments.

As indicated at Block G in FIG. 17, a groove is milled in the inner diameter of the spillstrip segment (or the packing ring segment) in order to accept brush segments manufactured at Blocks A through C, described above. The CNC milling equipment shown in FIGS. 9A and 9B can be used to machine the required radius of curvature surfaces into the spillstrip body portion. This same equipment can be easily modified for milling surfaces in the body portion packing ring segments according to the present invention. As indicated at Block H, manufactured brush (seal) segments are inserted into the groove milled into the body portion of the spillstrip segments (or packing segments as the case may be). This step of the manufacturing process can be carried out using robotic machinery and the like. Once inserted within the groove of the. body portion (of the spillstrip segment or packing ring segment), the individual brush segments are welded into place, as indicated at Block I. The assembled spillstrip segments are then installed into a trimming fixture, with a clamp stiffener disposed about the bristles, as indicated at Block I. As indicated at Block K in FIG. 17, the end portion of the bristles are trimmed using a shaper cutter so that the tip portions thereof conform to a surface having a radius of curvature that corresponds with the radius of curvature of the shroudband of the rotor. The apparatus illustrated in FIGS. 9A and 9B can be used to carry out such brush trimming operations. In the case of spillstrip segment manufacture, the radius of curvature associated with the cutting surface of the milling machine is set to the radius of curvature of the shroud band of the rotor. In the case of packing ring segment manufacture, the radius of curvature associated with the cutting surface of the milling machine is set to the radius of curvature of the corresponding surface on the turbine shaft.

Figure 18:
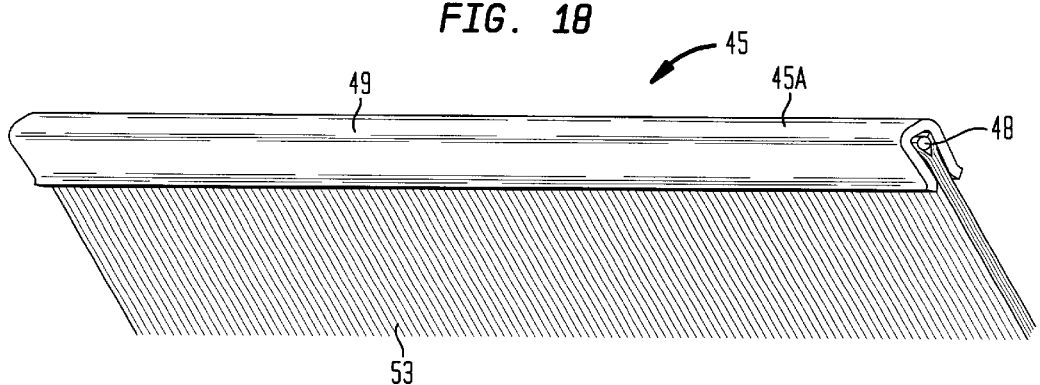
FIG. 18 is a perspective view of a third illustrative embodiment of the brush segment of the present invention, wherein its bristles substantially perpendicular to the longitudinal axis of the segment.
Figure 18A:
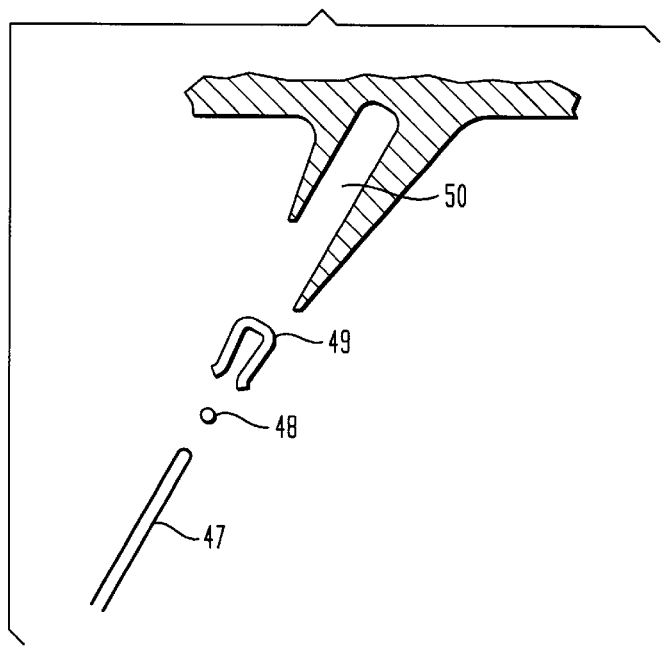
FIG. 18A is a cross-sectional, exploded diagram of the brush segment of FIG. 18, showing the bristle material, channel structure and wire core used to form the brush pack thereof, for insertion into the brush slot milled into the body portion of the packing ring segment (or a spillstrip segment of the present invention)
Figure 18B:
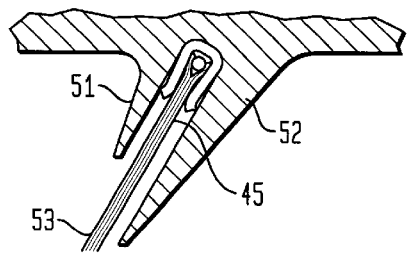
FIG. 18B is a cross-sectional diagram showing the brush segment of FIG. 18 installed within the slot formed between the fin-like projections milled into the body portion of the spillstrip segment (or packing ring segment) of the present invention.

In FIG. 18, a third illustrative embodiment of the brush segment of the present invention, 45, is shown. In this alternative brush segment design, each bristle strip 46 of desired length is formed by taking bristle material 47 (approximately twice the desired the bristle length), folding the material about a wire core 48, and then binding the folded bristle material within a rectilinearly extending channel structure 49, as shown in FIGS. 18A and 18B. Preferably, the channel structure 49 is made from metal, but other materials may be suitable in particular applications. When the brush strip 45 is completely assembled, the wire core 48 is securely held between the walls of the channel structure 49, thereby securing the bristles therewith. When assembled, the bristles extend perpendicularly from the rear surface 45A of the bound bristle strip 45. Also, when installed within a turbine system, the bristles extend at an angle with respect to the principal plane of the rotor.

As shown in FIGS. 18A and 18B, the assembled brush strip 45 is inserted into a brush slot 50 milled into the body portion of a packing ring segment or into the body portion of a spillstrip segment. The groove and its surfaces can be milled in order to conform the radius of curvature requirements of the particular turbine stage of concern. In the embodiment shown in FIGS. 18A and 18B, slot 50 is formed between a pair of fin-like projections 51 and 52 milled into the body portion of the spillstrip segment (or packing ring segment). The bristles extend from milled slot 50 and extend slightly beyond rear fin-like projection 52, which is larger than projection 51, but slight shorter than bristle 53.

Figure 19:
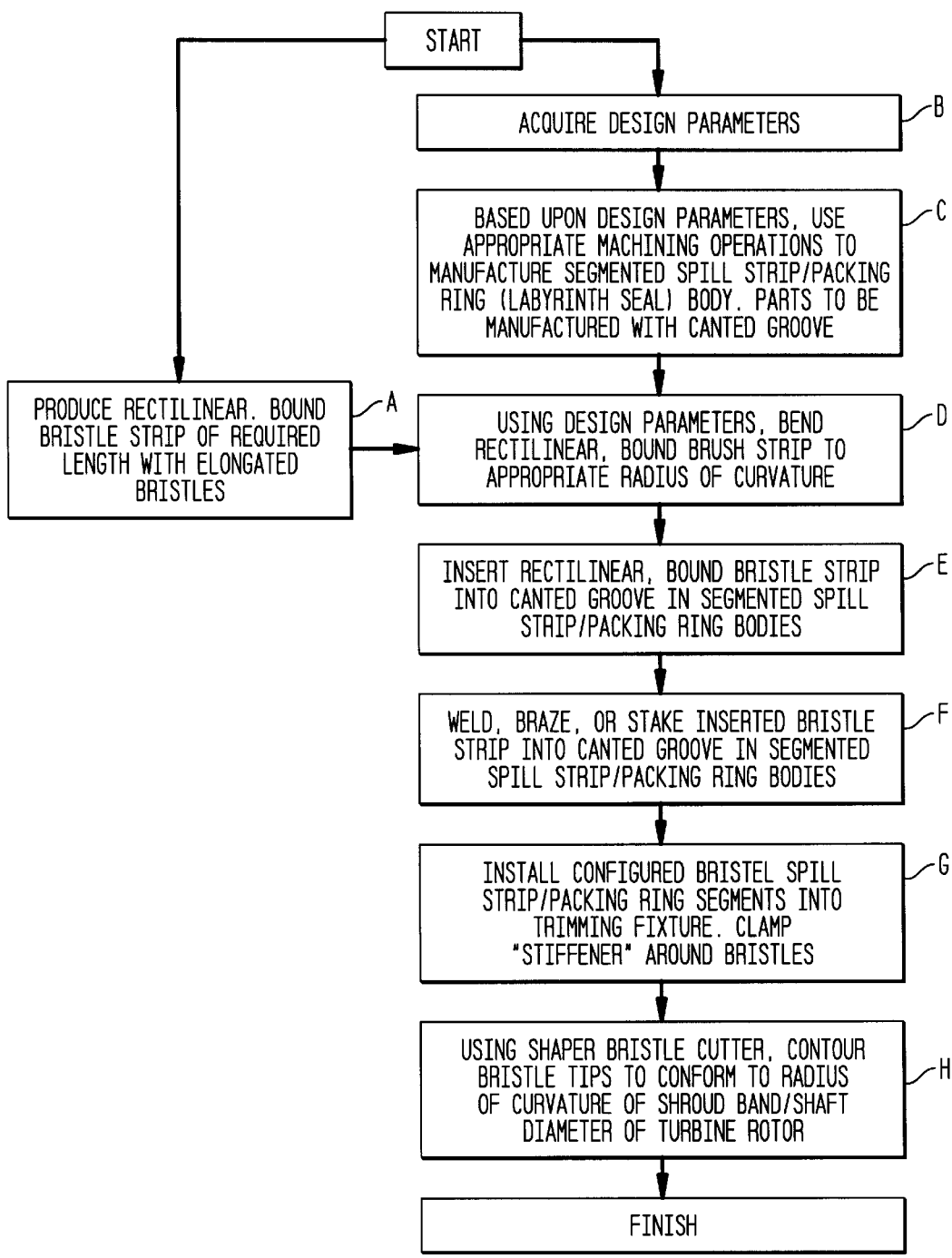
FIG. 19 is a flow chart setting forth the steps involved in manufacturing brush segments shown in FIGS. 18 through 18B, as well as spillstrip ring segments and packing ring segments shown in FIGS. 13 through 15.

Referring to FIG. 19, a method for manufacturing the canted-type spillstrip segments and packing ring segments incorporating brush strips 45 will now be described below.

As indicated at Block A in FIG. 19, the first step of the generalized method involves producing rectilinear bound brush strips (i.e., segments) 45 of the required length. At Blocks B through H in FIG. 19, packing ring segments or spillstrip ring segments are manufactured by a subprocess independent from the subprocess represented at Block A. At Block B, the design parameters for the spillstrip ring or packing ring are acquired using measurement techniques well known in the art. At each turbine stage of interest, the design parameters to be acquired for spillstrip ring designs will typically include: the radius of curvature of the rotor; the radius of curvature of the surface of the groove in diaphragm receiving the spillstrip ring segments; the width of the rotor (wheel) shroud band; the clearing existing between the turbine shaft and spillstrip; the "as found" wear of the spillstrip fins (teeth); etc. The design parameters to be acquired for packing ring designs will typically include: the radius of curvature of the turbine shaft and its packing ring surfaces mounted thereabout; the radius of curvature of the surface of the groove in diaphragm receiving the packing ring segments; the pitch and number of labyrinth steps (lands) on the turbine shaft; the clearing existing between the turbine shaft and packing ring; the "as found" wear of the packing ring fins (teeth); etc. Once collected, such parameter measurements are recorded for use in manufacturing the spillstrip ring segments and packing ring segments of the present invention.

As indicated at Block C, the design parameters acquired at Block B are then used to manufacture (e.g., mill) the body portion of each spillstrip ring segment (or packing ring segment) with a canted groove 54, as illustrated in FIG. 15

Conventional CNC milling equipment can be used to manufacture the canted grooves in the body portions of the spillstrip segments and the packing ring segments.

As indicated at Block D in FIG. 19, the acquired designed parameters are used to bend the rectilinear bound brush strip 45 to the appropriate radius of curvature. Thereafter, as indicated at Block F, the brush strip is inserted into the canted groove in the body portion of the spillstrip ring segment or packing ring segment. As indicated at Block G, the inserted bristle strip is then (TIG) welded, brazed or staked into its canted groove in the spillstrip ring segment or packing ring segment. These steps of the manufacturing process can be carried out using robotic machinery and the like. As indicated at Block G, the assembled spillstrip segments are then installed into a trimming fixture, with a clamp stiffener disposed about the bristles. As indicated at Block H in FIG. 19, the end portion of the bristles are trimmed using a cutter so that the tip portions thereof conform to a surface having a radius of curvature that corresponds with the radius of curvature of the surface against which a continuous brush seal is to be formed during operation. The apparatus illustrated in FIGS. 9A and 9B can be used to carry out such brush trimming operations. In the case of spillstrip segment manufacture, the radius of curvature associated with the cutting surface of the milling machine is set to the radius of curvature of the shroud band of the rotor. In the case of packing ring segment manufacture, the radius of curvature associated with the cutting surface of the milling machine is set to the radius of curvature.

While the brush seal designs of the present invention have been illustrated in great detail in connection with improved spillstrips and packing rings, it is understood that such brush seal design can be applied to other subcomponents of elastic steam turbines. For example, the brush seal designs of the prevent invention can be used in "rotating" applications such as in the fabrication of: improved snout rings; improved bell seals; substitute seal for J strips and knurled strips (around nozzles); improved contact-type seals/packing (common on 1st Stage Of Reheat Section on large GE And Westinghouse turbines); improved upstream and downstream faces of diaphragms or wheels in order to create an actual seal, or to increase the surface roughness, create more turbulence in the flow, and effectively reduce flow area by reducing the area for laminar flow; particulate separator realized as by a ring of brushes (or rings in stages) at a location between the boiler and the turbine nozzle (which would serve to reduce steam path damage and reduces chance of particles jamming up retractable packing; seals as part of a particular separating pocket, in conjunction with coated tip seals; improved seals between/at bushings to prevent additional leakage or stem damage, and in conjunction with steam strainer; improved to seals at butt joints of packing/spills; and improved joints of shells/diaphragms/gland carriers.

Also, the brush seal design of the present invention can be used in "rotating" applications, such as in the fabrication of: substitutes for J-strips (on rotor or in diaphragm/blade rings); improved or replacement water/oil seals and/or hydrogen seals.

Figure 20:
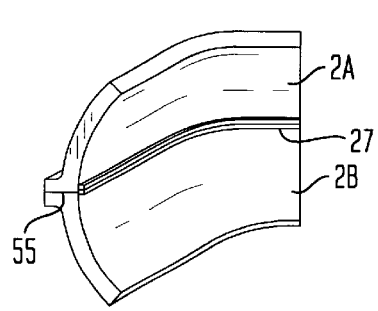
FIG. 20 is perspective view of a portion of the outer casing of the turbine of FIG. 1, showing the use of the brush seal segments according to the second illustrative embodiment of the present invention in order to send off the joint gap formed between the top and bottom casing portions.
Figure 20A:
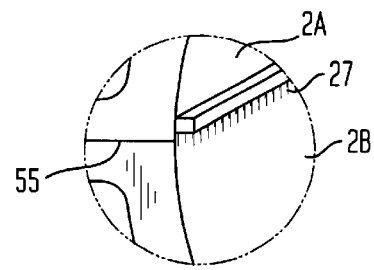
FIG. 20A is cross-sectional view of the brush seal segment and casing outer halves shown in FIG. 20.
Figure 20B:
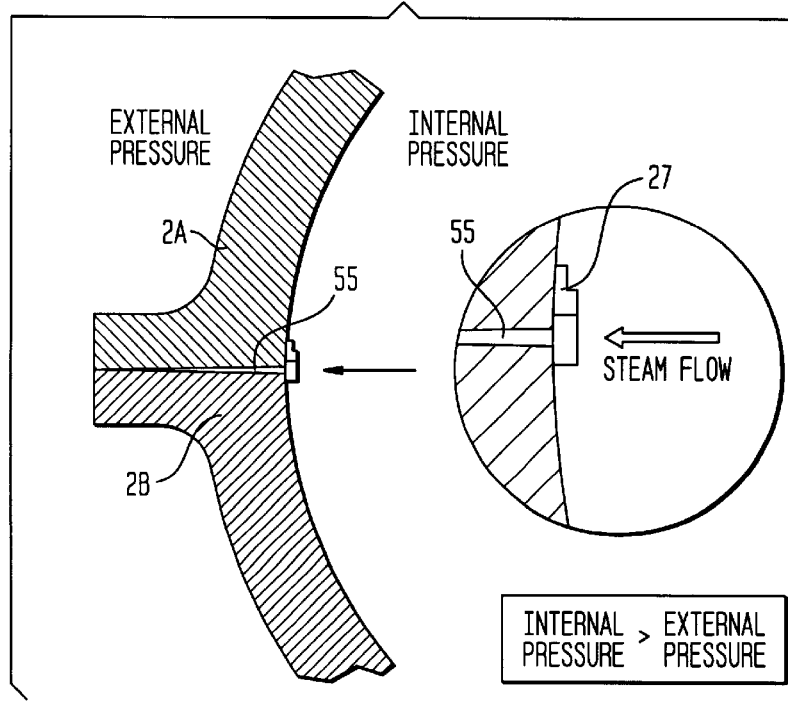
FIG. 20B is a cross-sectional view similar to the perspective cross-sectional view shown in FIG. 20A that depicts a brush seal segment sealing the casing.

In FIGS. 20, 20A, and 20B the brush seal technology of the present invention is used to realize horizontal joint seals.

Figure 21:
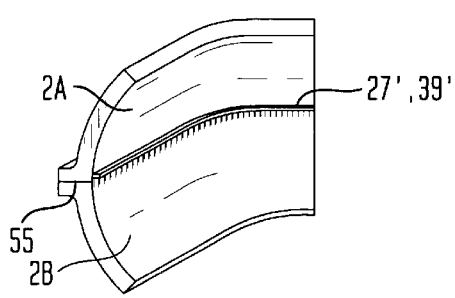
FIG. 21 is perspective view of a portion of the outer casing of the turbine of FIG. 1, showing the use of brush seal segments according to the second illustrative embodiment of the present invention in order to seal off the joint gap formed between the top and bottom casing portions.

As shown in FIG. 20, the joint gap 55 formed between the top and bottom casing portions 2A and 2B of the turbine is shown. Vapor leakage from the joint gap 55 is effectively sealed off by mounting brush-type segments 27 or 39 over the joint gap to form a continuous joint gap seal, as shown in FIG. 20. In FIG. 21, an alternative type of joint gap seal is realized using segments 27' or 39' having flexible metallic strips, rather than metallic bristles. The brush-type joint seal shown in FIG. 20 can be realized by mounting bristles within the body portion of mounting strip, in a manner similar to that shown in FIG. 5. The flexible-strip type joint gap seal segments can be made by mounting narrow strips of flexible material between a pair of thin plates. The body portion of the brush segments can be secured to interior wall surfaces of the casing, immediately above the joint gap 55, by welding, brazing, screws or other fasteners well known in the art.

Figure 21A:
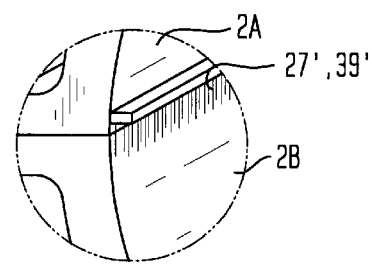
FIG. 21A is a perspective cross-sectional view similar to that of FIG. 20A that , depicts flexible strips to seal the casing.

As illustrated ion FIG. 20A, the bristles, or flexible strips, of the brush-type joint gap sealing strip are mounted immediately above the joint gap of a turbine. As the interior pressure of the turbine increases during operation, the bristles (or flexible strip) become compressed and effectively seal off the joint gap. FIGS. 20B and 21A separately illustrate the compression of the bristles and flexible strips, respectively, during operation of the brush seal of the present invention.

Various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An elastic fluid turbine employing seals to minimize leakage between rotating and stationary components and utilizing the combination of a segmented seal ring supported by and at least partially contained in an annular groove formed in a stationary casing to permit motion of said seal ring between a large diameter position and a small diameter position corresponding respectively to large and small clearance of said seal ring with regard to the rotating shaft said seal ring groove being partially defined by a pair of opposing, spaced apart shoulders on said casing which form an opening of said groove extending radially into the clearance area between said casing and said rotating shaft, said turbine including at least one stage having (i) at least one diaphragm stationarily mounted in said casing and having a plurality of steam directing nozzles, and (ii) a rotor fixedly attached to said turbine shaft and having a plurality of blades bounded by a shroud and disposed adjacent to said plurality of steam directing nozzles, each segment of said seal ring including an inner arcuate portion having seal teeth extending therefrom in the direction of and adjacent to said rotating shaft a radially outwardly facing arcuate surface on said seal ring segment which is located opposite to a radially inward facing arcuate surface on said casing for limiting said large clearance position by contact between said opposing surfaces, an outer ring portion disposed within said seal ring groove for both axial and radial movement therein and having a pair of shoulders extending axially in opposite directions for making radial contact respectively with said pair of spaced apart shoulders on said casing and thereby limiting said small clearance position;

a neck portion connected between said inner arcuate portion and said outer ring portion and extending between said casing shoulders, said neck portion having an axial thickness which is less than the distance between said opposing casing shoulders to thereby axially locate said seal ring segment against one of said casing shoulders and provide a contact pressure seal at the said side of said neck portion which is subject to lower turbine fluid pressure;

a radial positioning means comprising a spring against said ring segments to forcibly cause said segments to move to said large clearance position contacts, while working fluid which flows into the annular space between said casing and said ring segments urges said segments toward said small clearance position, whereby at low speed and small turbine loads the spring forces wilt predominate, while at high flows and high working fluid pressure the pressure forces will predominate;

each of said ring segments comprising:

a body portion for mounting within a portion of said diaphragm and having a longitudinal extent, a vertical extent, and a horizontal extent, and being particularly adapted for mounting in a portion of said diaphragm, said body portion having a groove formed along said vertical extent and extending along said longitudinal extent; and a plurality of brush segments mounted within said groove of said packing ring segment, each said brush segment having a packet of bristles with said bristles having tip portions trimmed to terminate along a radius of curvature continuously extending along the longitudinal extent of said body portion so as to form a labyrinth seal with said turbine shaft, and each said bristle being disposed in a plane substantially parallel to the principal plane of said rotor and extending in the direction of rotation of said turbine shaft.

2. The fluid turbine seal arrangement as recited in claim 1, wherein said inner arcuate portion of said seal ring segment comprises an inner ring portion connected at one side to said neck portion and includes said radially outward facing arcuate surface for limiting said large clearance position by said contact with said casing surface said inner ring portion having said seal teeth extending therefrom.

3. The fluid turbine seal arrangement as recited in claim 2, where in said inner ring portion extends substantially from said neck portion axially in both directions such that said inner ring portion is substantially wider than said neck portion and has said seal teeth extending therefrom radially into said clearance area.

4. The fluid turbine seal arrangement as recited in claim 3, wherein said radially outwardly facing arcuate surface in said seal ring segment which is located opposite to a radially inward facing arcuate surface of said casing comprises the radially outward facing surfaces of said inner ring portion.

5. A packing ring for use in forming a seal with a turbine shaft rotatably mounted within the casing of an axial flow elastic fluid turbine, wherein said axial flow elastic fluid turbine includes at least one stage having (i) at least one diaphragm stationarily mounted in said casting and having a plurality of steam directing nozzles, and (ii) a rotor fixedly attached to said turbine shaft and having a plurality of blades bounded by a shroud and disposed adjacent said plurality of steam directing nozzles, said packing ring having a plurality of packing ring segments adapted to be mounted in a groove circumferentially in said diaphragm for forming a seal with said turbine shaft, each said packing ring segment comprising:

an inner ring portion having a plurality of brush segments mounted within a brush mounting groove formed in said inner ring, each said brush segment having a packet of bristles with said bristles having tip portions trimmed to terminate along a radius of curvature adapted to form a steam seal with said turbine shaft, each said bristle being adapted to be disposed in a plane substantially parallel to the principal plane of said rotor and extending in the direction of rotation of said turbine shaft;

an outer ring portion adapted to be disposed within said circumferential groove for both axial and radial movement of said segment therein and having a pair of shoulders extending axially in opposite directions adapted for making radial contact respectively with a pair of spaced apart shoulders on said casing and thereby adapted for limiting movement of said segment radially with respect to said shaft;

a neck portion connected between said inner arcuate portion and said outer ring portion and adapted for extending between said casing shoulders, said neck portion having an axial thickness which is adapted to be less than the distance between said opposing casing shoulders to thereby be adapted to axially locate said seal ring segment against one of said casing shoulders and provide a contact pressure seal at the side of said neck portion which is subject to lower fluid pressure; and a radial positioning means comprising a spring against said ring segments adapted to forcibly cause said segments to move radially outward away from said shaft, whereas working fluid flowing into the annular space between said casing and said ring segments will urge said segments radially inward towards said shaft, whereby at low speed and small turbine loads the spring forces will predominate, while at high flows and high working fluid pressure the pressure forces will predominate.

6. The packing ring of claim 5, wherein the bristles within each said bristle packet are bound between a pair of plates having an incised channel to receive the base end portion of said bristles.

7. The packing ring of claim 6, wherein said plates of each said brush segment have a bottom edge surface with a radius of curvature adapted to conform to the radius of curvature of said groove formed in said vertical portion.

8. The packing ring of claim 5, wherein the bristles within each said brush segment are bound within a channel by a core strip securing said bristles within said channel.

9. The packing ring of claim 5, wherein said channel has a bottom edge surface with a radius of curvature adapted to conform to the radius of curvature of said groove formed in said vertical portion.

10. An axial flow elastic fluid turbine comprising:

an outer casting;

a turbine shaft rotatably supported in said outer casting; and a plurality of turbine stages installed along said turbine shaft and contained within said outer casting, each said turbine stage including a diaphragm stationarily mounted in a recess formed in said turbine casting and having a plurality of steam directing nozzles, a rotor fixedly attached to said turbine shaft and having a plurality of blades bounded by a shroud band and being disposed adjacent said plurality of steam directing nozzles, and a packing ring consisting of an arrangement of packing ring segments mounted in a circumferentially extending groove formed in said diaphragm and providing a continuously extending seal with said turbine, each said packing ring segment including
  a body portion for mounting within said circumferentially formed groove and having a longitudinal extent, a vertical extent, and a horizontal extent, and being particularly adapted for mounting in a portion of said diaphragm, said body portion having a brush mounting groove formed along said vertical extent and extending along said longitudinal extent; and
  a plurality of brush segments mounted within said brush mounting groove of said packing ring segment, each said brush segment having a packet of bristles with said bristles having tip portions trimmed to terminate along a radius of curvature adapted to form a steam seal with said turbine shaft, and
  each said bristle being disposed in a plane substantially parallel to the principal plane of said rotor and extending in the direction of rotation of said turbine shafts
  a radial positioning means comprising a spring between adjacent ring segments to forcibly cause said segments to move to a large clearance position, while working fluid flows into to an annular space between said casing and said ring segments urges said segments toward said small clearance position, whereby at low speed and small turbine loads the spring forces will predominate, while at high flows and high working fluid pressure the pressure forces will predominate;
  wherein said brush segment form a continuous seal.

11. The axial flow elastic fluid turbine of claim 10, wherein the bristles within each said bristle segment are bound between a pair of plates having an incised channel to receive the base end portion of said bristles.

12. The axial flow elastic fluid turbine of claim 11, wherein said plates of each said brush segment have a bottom edge surface with a radius of curvature adapted to conform to the radius of curvature of said groove formed in said vertical portion.

13. The axial flow elastic fluid turbine of claim 10, wherein the bristles within each said brush segment are bound within a channel by a core strip securing said bristles within said channel.

14. The axial flow elastic fluid turbine of claim 13, wherein said channel has a bottom edge surface with a radius of curvature adapted to conform to the radius of curvature of said groove formed in said vertical portion.

15. The axial flow elastic fluid turbine as recited in claim 10, wherein said seal ring segment further comprises seal teeth extending therefrom.

16. The axial flow elastic fluid turbine as recited in claim 15, wherein said inner ring portion extends substantially from said neck portion axially in both directions such that said inner ring portion is substantially wider than said neck portion and has said seal teeth extending therefrom radially into said clearance area.

17. The axial flow elastic fluid turbine as recited in claim 16, wherein said radially outwardly facing arcuate surface in said seal ring segment which is located opposite to a radially inward facing arcuate surface of said casing comprises the radially outward facing surfaces of said inner ring portion.

18. A packing ring segment for use in forming a labyrinth seal with a turbine shaft rotatably mounted within the casing of an axial flow elastic fluid turbine, wherein said axial flow elastic fluid turbine includes at least one stage having (i) at least one diaphragm stationarily mounted in said casting and having a plurality of steam directing nozzles, and (ii) a rotor fixedly attached to said turbine shaft for rotation about an axis of rotation and having a plurality of blades bounded by a shroud band disposed within a principal plane of said rotor and adjacent said plurality of steam directing nozzles, said packing ring segment comprising:
  a body portion for mounting within a portion of said diaphragm and having a longitudinal extent, a vertical extent, and a horizontal extent, and being particularly adapted for mounting in a portion of said diaphragm, said body portion having a groove formed along said vertical extent and extending along said longitudinal extent, said body portion having a bore in a side edge surface for accepting a spring spanning said bore and an adjacent packing ring segment according to this claim; and
  a plurality of brush segments mounted within said groove of said packing ring segment, each said brush segment having a packet of bristles with said bristles having tip portions trimmed to terminate along a radius of curvature continuously extending along the longitudinal extent of said body portion effective to form a labyrinth seal when a turbine shaft is positioned along said tip portions of said bristles, and
  each said bristle being disposed at an acute angle with respect to said radius of curvature.

19. The packing ring segment of claim 18, wherein the bristles within each said bristle segment are bound between a pair of plates having an incised channel to receive the base end portion of said bristles.

20. The packing ring segment of claim 19, wherein said plates of each said brush segment have a bottom edge surface with a radius of curvature adapted to conform to the radius of curvature of said groove formed in said vertical portion.

21. The packing ring segment of claim 18, wherein the bristles within each said brush segment are bound within a channel by a core strip securing said bristles within said channel.

22. A turbine or compressor comprising at least one packing ring segment as defined by claim 18.

23. A moveable brush sealing system for inhibiting the flow of a wording fluid between a rotating shaft and a stationary casing comprising:
  a stationary casing having a circumferential seal ring groove formed therein, said seal ring groove having an opening into a clearance area surrounding said shaft;
  at least one segmented retractable seal ring including a plurality of seal segments, each of said seal ring segments including: (i) an outer member mounted within and supported by said seal ring groove, (i) an inner member mounted within said clearance area, said inner member including an outer surface facing said casing and an inner arcuate surface facing said rotating shaft, and (iii) a neck member extending through said opening in said seal ring groove and connecting said inner and outer members;
  a spring biased against said seal ring segment to move said seal ring segment to a large diameter position in which said seal member has a large clearance with respect to said rotating shaft;
  aperatures through the casing or through at least one of said segments to permit the free flow of working fluid into the seal ring groove to move the segment to a small diameter position in which the seal member has a small clearance with respect to the shaft; and
  a seal member attached to the inner arcuate surface of said inner member of said seal segment, said seal member including a brush seal having an array of bristles that extend generally radially inwardly toward said rotating shaft.

24. A moveable brush sealing system as claimed in claim 23, in which said sealing member includes teeth attached to said inner arcuate surface which extend toward said rotating member effective to form a labrynth seal.

25. A moveable brush sealing system as claimed in claim 23, in which said sealing member includes a plurality of teeth attached to said inner arcuate surface which extend toward said rotating member, and said shaft has raised areas cooperating with said teeth effective to form a labrynth seal.

26. A seal as claimed in claim 23, in which said seal member includes at least one circumferentially arranged brush mounting groove formed in said inner arcuate portion of said inner member and a plurality of brush segments mounted in said brush mounting groove each of said brush segments having a packet of bristles with said bristles having tip portions trimmed to terminate along a radius of curvature adapted to form a fluid seal with said turbine shaft.

27. A seal as claimed in claim 26, in which said brush segments include a packet of fine bristles bound and secured together between a front and back plate which are attached together to form a unitary segment structure, said back plate having an extent towards said shaft beyond the front plate to provide support for the packet of bristles.

28. A seal as claimed in claim 26, in which said circumferential row of bristles are disposed in a plane substantially parallel to the principal plane of said rotating component and the ends of said bristles contact the rotating shaft when the seal member is at the small diameter small clearance position so that the bristles are deflected in the direction of rotation of said turbine shaft.

29. A seal for use in an elastic fluid turbine to minimize leakage of the working fluid between rotating and stationary components including:

a segmented seal ring supported by and at least partially contained in an annular seal ring groove formed in the stationary component to permit motion of said seal ring between a larger diameter position and a smaller diameter position corresponding respectively to the large and small clearance position of said seal ring with respect to the rotating component, said seal ring groove being partially defined by a pair of opposing, spaced apart shoulders disposed axially on said stationary component which form an opening of said groove extending radially into the clearance area between said stationary and said rotating components;

each segment of said seal ring including (i) an outer ring portion disposed within said seal ring groove for both axial and radial movement therein, (ii) an inner ring portion disposed in said clearance area which includes (a) an inner arcuate portion having a sealing member which includes a number of teeth extending therefrom in the direction of said rotating component and (iii) a neck portion connecting said inner ring portion and said outer ring portion and extending between said opposing, spaced apart shoulders on said stationary component, said neck portion having an axial thickness which is less than the distance between said opposing, spaced apart shoulders to permit said seal ring segment to move axially against one of said shoulders to provide a contact pressure seal at the side of said neck portion which is subject to lower turbine fluid pressure;

a compressed spring biased against said ring segments to forcibly cause said segments to move radially outwardly to said larger diameter large clearance position at shut off and under low turbine loads;

at least one opening formed in said stationary portion or in at least one of said segments to allow said working fluid to flow into the annular space between said casing and said ring segments to urge said segments radially inwardly toward said smaller diameter small clearance position as turbine load increases; and wherein said sealing member further includes at least one brush element, said brush element including a circumferentially arranged row of bristles that extend from said inner arcuate portion of said inner ring portion toward said rotating component.

30. A seal as claimed in claim 29, in which said sealing member includes at least on circumferentially arranged brush mounting groove formed in said inner arcuate portion of said inner ring portion and said brush element includes a plurality of brush segments mounted within said brush mounting groove, each said brush segment having a packet of bristles with said bristles having tip portions trimmed to terminate along a radius of curvature adapted to form a steam seal with said turbine shaft.

31. A seal as claimed in claim 29, in which said circumferential row of bristles are disposed in a plane substantially parallel to the principal plane of said rotating component and the ends of said bristles contact the rotating shaft so that the bristles are deflected in the direction of rotation of said turbine shaft.

32. A packing ring for sealing a shaft in a steam turbine, the packing ring disposed in a groove of a diaphragm in a casing of the steam turbine, comprising:

a. a plurality of ring segments, ring segment having an inner face adapted to form a steam seal with the shaft, and having a brush mounted on said inner face, having bristles adapted to form a steam seal with the shaft;

b. at least one spring, for biasing one or more of said ring segments radially away from the shaft; and c. a steam biasing means, for biasing said ring segments radially toward the shaft upon a sufficient build up of steam pressure within the turbine, whereby the force of said spring will predominate during low speeds and turbine loads, and whereby the force of said steam biasing means will predominate during high speeds and turbine loads.

* * * * *

EX PARTE REEXAMINATION CERTIFICATE (6222nd)
United States Patent
Addis et al.

(10) Number: US 6,318,728 C1
(45) Certificate Issued: May 6, 2008

(54) BRUSH-SEAL DESIGNS FOR ELASTIC FLUID TURBINES

(75) Inventors: Mark E. Addis, Wakefield, RI (US); Willaim S. Dalton, Chesterfield, MA (US)

(73) Assignee: Demag Delaval Turbomachinery Corporation, Trenton, NJ (US)

Reexamination Request:
No. 90/008,032, May 16, 2006

Reexamination Certificate for:
Patent No.: 6,318,728
Issued: Nov. 20, 2001
Appl. No.: 09/199,127
Filed: Nov. 24, 1998

Related U.S. Application Data

(62) Division of application No. 08/891,526, filed on Jul. 11, 1997, now abandoned.

(51) Int. Cl.
*F01D 11/02* (2006.01)

(52) U.S. Cl. ............. 277/355; 277/174.5; 277/416
(58) Field of Classification Search ........... 277/355, 277/413, 416, 421, 422; 415/173.3, 173.5, 415/174.2–174.5
See application file for complete search history.

(56) References Cited

U.S. PATENT DOCUMENTS

| | | | |
|---|---|---|---|
| 3,917,150 A | 11/1975 | Ferguson et al. | |
| 4,436,311 A | 3/1984 | Brandon | |
| 4,730,876 A | 3/1988 | Werner et al. | |
| 5,749,584 A | 5/1998 | Skinner et al. | |
| 7,032,903 B1 * | 4/2006 | Dalton et al. ............... | 277/355 |

* cited by examiner

*Primary Examiner*—Matthew C. Graham

(57) ABSTRACT

Disclosed are improved spillstrip and packing rings, and packing ring segments employing novel brush elements for use in forming seals in axial flow elastic fluid machines, and compressor and turbine machines containing the same.

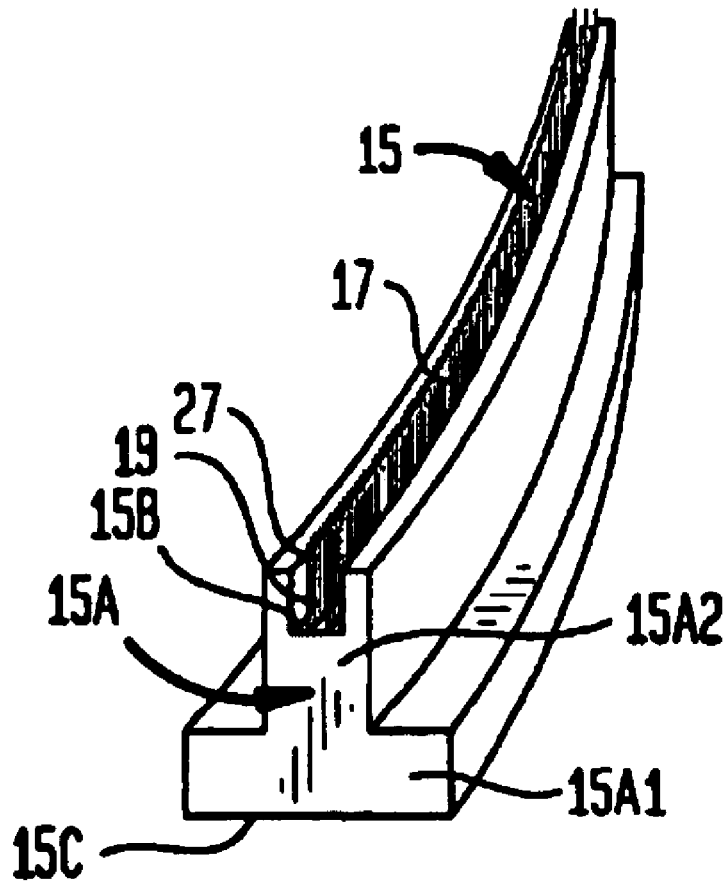

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–22 is confirmed.

Claim 32 is cancelled.

Claims 23–26, 29 and 30 are determined to be patentable as amended.

Claims 27–28 and 31, dependent on an amended claim, are determined to be patentable.

New claims 33–42 are added and determined to be patentable.

23. A moveable brush sealing system for inhibiting the flow of a [wording] *working* fluid between a rotating shaft and a stationary casing comprising:
   a stationary casing having a circumferential seal ring groove formed therein, said seal ring groove having an opening into a clearance area surrounding said shaft;
   at least one segmented retractable seal ring including a plurality of seal *ring* segments, each of said seal ring segments including: (i) an outer member mounted within and supported by said seal ring groove, (i) an inner member mounted within said clearance area, said inner member including an outer surface facing said casing and an inner arcuate surface facing said rotating shaft; and (iii) a neck member extending through said opening in said seal ring groove and connecting said inner and outer members;
   *a seal member attached to the inner arcuate surface of said inner member of said seal ring segment, said seal member including a brush seal having an array of bristles that extend generally radially inwardly toward said rotating shaft;*
   a spring biased against said seal ring segment to move said seal ring segment to a large diameter position in which said seal member has a large clearance with respect to said rotating shaft; *and*
   [aperatures] *apertures* through the casing or through at least one of said segments to permit the free flow of working fluid into the seal ring groove to move the segment to a small diameter position in which the seal member has a small clearance with respect to the shaft[; and],
   [a seal member attached to the inner arcuate surface of said inner member of said seal segment, said seal member including a brush seal having an array of bristles that extend generally radially inwardly toward said rotating shaft]
   *the brush seals of the seal ring segments forming a continuous seal around the shaft.*

24. A moveable brush [scaling] *sealing* system as claimed in claim 23, in which said [sealing] *seal* member includes teeth attached to said inner arcuate surface which extend toward said rotating member effective to form a [labrynth] *labyrinth* seal.

25. A moveable brush sealing system as claimed in claim 23, in which said [sealing] *seal* member includes a plurality of teeth attached to said inner arcuate surface which extend toward said rotating member, and said shaft has raised areas cooperating with said teeth effective to form a [labrynth] *labyrinth* seal.

26. [A seal as claimed in claim 23, in which] *A moveable brush sealing system for inhibiting the flow of a working fluid between a rotating shaft and a stationary casing comprising:*
   *a stationary casing having a circumferential seal ring groove formed therein, said seal ring groove having an opening into a clearance area surrounding said shaft;*
   *at least one segmented retractable seal ring including a plurality of seal ring segments, each of said seal ring segments including: (i) an outer member mounted within and supported by said seal ring groove, (i) an inner member mounted within said clearance area, said inner member including an outer surface facing said casing and an inner arcuate surface facing said rotating shaft, and (iii) a neck member extending through said opening in said seal ring groove and connecting said inner and outer members;*
   *a seal member attached to the inner arcuate surface of said inner member of said seal ring segment, said seal member including a brush seal having an array of bristles that extend generally radially inwardly toward said rotating shaft;*
   *a spring biased against said seal ring segment to move said seal ring segment to a large diameter position in which said seal member has a large clearance with respect to said rotating shaft; and*
   *apertures through the casing or through at least one of said segments to permit the free flow of working fluid into the seal ring groove to move the segment to a small diameter position in which the seal member has a small clearance with respect to the shaft, and*
   said seal member includes at least one circumferentially arranged brush mounting groove formed in said inner arcuate portion of said inner member and a plurality of brush segments mounted in said brush mounting groove, each of said brush segments having a packet of bristles with said bristles having tip portions trimmed to terminate along a radius of curvature adapted to form a fluid seal with said turbine shaft.

29. A seal for use in an elastic fluid turbine to minimize leakage of the working fluid between rotating and stationary components including:
   a segmented seal ring supported by and at least partially contained in an annular seal ring groove formed in the stationary component to permit motion of said seal ring between a larger diameter position and a smaller diameter position corresponding respectively to the large and small clearance position of said seal ring with respect to the rotating component, said seal ring groove being partially defined by a pair of opposing, spaced apart shoulders disposed axially on said stationary component which form an opening of said groove extending radially into the clearance area between said stationary and said rotating components;
   each segment of said seal ring including (i) an outer ring portion disposed within said seal ring groove for both axial and radial movement therein, (ii) an inner ring portion disposed in said clearance area which includes (a) an inner arcuate portion having a sealing member which includes a number of teeth extending therefrom in the direction of said rotating component and (iii) a neck portion connecting said inner ring portion and said outer ring portion and extending between said opposing, spaced apart shoulders on said stationary component, said neck portion having an axial thickness which is less than the distance between said opposing, spaced apart shoulders to permit said seal ring segment to move axially against one of said shoulders to provide a contact pressure seal at the side of said neck portion which is subject to lower turbine fluid pressure;

a compressed spring biased against said ring segments to forcibly cause said segments to move radially outwardly to said larger diameter large clearance position at shut off and under low turbine loads;

at least one opening formed in said stationary portion or in at least one of said segments to allow said working fluid to flow into the annular space between said casing and said ring segments to urge said segments radially inwardly toward said smaller diameter small clearance position as turbine load increases; and wherein said sealing member further includes at least one brush element, said brush element including a circumferentially arranged row of bristles that extend from said inner arcuate portion of said inner ring portion toward said rotating component,

*the brush element of said seal ring segments forming a continuous brush seal.*

30. A seal [as claimed in claim 29, in which] *for use in an elastic fluid turbine to minimize leakage of the working fluid between rotating and stationary components including:*

*a segmented seal ring supported by and at least partially contained in an annular seal ring groove formed in the stationary component to permit motion of said seal ring between a larger diameter position and a smaller diameter position corresponding respectively to the large and small clearance position of said seal ring with respect to the rotating component, said seal ring groove being partially defined by a pair of opposing, spaced apart shoulders disposed axially on said stationary component which form an opening of said groove extending radially into the clearance area between said stationary and said rotating components;*

*each segment of said seal ring including (i) an outer ring portion disposed within said seal ring groove for both axial and radial movement therein, (ii) an inner ring portion disposed in said clearance area which includes (a) an inner arcuate portion having a sealing member which includes a number of teeth extending therefrom in the direction of said rotating component and (iii) a neck portion connecting said inner ring portion and said outer ring portion and extending between said opposing, spaced apart shoulders on said stationary component, said neck portion having an axial thickness which is less than the distance between said opposing, spaced apart shoulders to permit said seal ring segment to move axially against one of said shoulders to provide a contact pressure seal at the side of said neck portion which is subject to lower turbine fluid pressure;*

*a compressed spring biased against said ring segments to forcibly cause said segments to move radially outwardly to said larger diameter large clearance position at shut off and under low turbine loads;*

*at least one opening formed in said stationary portion or in at least one of said segments to allow said working fluid to flow into the annular space between said casing and said ring segments to urge said segments radially inwardly toward said smaller diameter small clearance position as turbine load increases; and* said sealing member [includes] *further including at least one brush element and* at least [on] *one* circumferentially arranged brush mounting groove formed in said inner arcuate portion of said inner ring portion, and said brush element includes a plurality of brush segments mounted within said brush mounting groove, each said brush segment having a packet of bristles with said bristles having tip portions trimmed to terminate along a radius of curvature adapted to form a steam seal with said turbine shaft.

33. A moveable brush sealing system as claimed in claim 23, wherein each of the seal ring segments includes a plurality of brush seals, each of the brush seals having an array of bristles.

34. A moveable brush sealing system as claimed in claim 23, wherein the brush seal has two side ends, and the bristles of the brush seal are oriented relative to the shaft at the same angle as the two side ends of the brush seal.

35. A moveable brush sealing system as claimed in claim 23, wherein the bristles of the brush seal extend in a radial direction relative to the shaft.

36. A moveable brush sealing system as claimed in claim 23, wherein the bristles of each array of bristles of the brush seals of adjacent seal ring segments have tip portions trimmed to terminate along a radius of curvature extending continuously between the adjacent seal ring segments.

37. A moveable brush sealing system as claimed in claim 23, wherein the bristles extend, at least at one side end of the seal ring segment, beyond said one side end of the seal ring segment.

38. A moveable brush sealing system as claimed in claim 29, wherein the sealing member of each seal ring segment includes a plurality of brush elements, each of said brush elements including a row of bristles.

39. A moveable brush sealing system as claimed in claim 29, wherein the brush element has two side ends, and the bristles of the brush element are oriented relative to the shaft at the same angle as the two side ends of the brush element.

40. A moveable brush sealing system as claimed in claim 29, wherein the bristles of the brush seal extend in a radial direction relative to a shaft.

41. A moveable brush sealing system as claimed in claim 29, wherein the bristles of each row of bristles of the brush elements of adjacent seal ring segments have tip portions trimmed to terminate along a radius of curvature extending continuously between the adjacent seal ring segments.

42. A moveable brush sealing system as claimed in claim 29, wherein the bristles extend, at least at one side end of the seal ring segment, beyond said one side end of the seal ring segment.

\* \* \* \* \*